(12) United States Patent
Jang et al.

(10) Patent No.: US 9,904,440 B2
(45) Date of Patent: Feb. 27, 2018

(54) MOBILE TERMINAL, CONTROLLING METHOD THEREOF, AND RECORDING MEDIUM THEREOF

(71) Applicant: LG ELECTRONICS INC., Seoul (KR)

(72) Inventors: Yujune Jang, Seoul (KR); Eunjeong Ryu, Seoul (KR); Meejeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 14/078,759

(22) Filed: Nov. 13, 2013

(65) Prior Publication Data

US 2014/0337729 A1 Nov. 13, 2014

(30) Foreign Application Priority Data

Dec. 7, 2012 (KR) ........................ 10-2012-0141764

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0486* (2013.01); *G06F 3/0488* (2013.01);
(Continued)

(58) Field of Classification Search
None
See application file for complete search history.

(56) References Cited

U.S. PATENT DOCUMENTS 8,185,591 B1 *  5/2012  Lewis ................. G06Q 10/107
                                                              358/1.15
2007/0220425 A1 *  9/2007  Matulic ............... G06Q 10/107
                                                              715/234
(Continued)

FOREIGN PATENT DOCUMENTS

CN          1372207        10/2002
CN         101527884        9/2009
(Continued)

OTHER PUBLICATIONS

Chinese Office Action dated May 30, 2016 issued in Application No. 201310660176.5 (English translation attached).
(Continued)

*Primary Examiner* — William Trapanese
(74) *Attorney, Agent, or Firm* — Ked & Associates, LLP

(57) ABSTRACT

A touchscreen displays an edit region for writing a message to transmit to at least one counterpart and an attach region for displaying an attachment file attached to the message. While a multimedia file is displayed on the attach region by being set as the attachment file of the message, and if the multimedia file displayed on the attach region is touched and dragged to the edit region, the controller controls the multimedia file to be displayed in a manner of being inserted in the edit region. While the multimedia file is displayed in a manner of being inserted in the edit region, and if the multimedia file displayed on the edit region is touched and dragged to the attach region, the controller controls the multimedia file to be set as the attachment file of the message.

15 Claims, 58 Drawing Sheets

(51) Int. Cl.
*G06Q 10/00* (2012.01)
*G06Q 50/00* (2012.01)
*G06F 3/0486* (2013.01)
*G06F 3/0488* (2013.01)
*H04L 12/58* (2006.01)

(52) U.S. Cl.
CPC ............ *G06Q 10/00* (2013.01); *G06Q 50/01* (2013.01); *H04L 51/08* (2013.01)

(56) References Cited

U.S. PATENT DOCUMENTS

| | | | |
|---|---|---|---|
| 2009/0049150 A1* | 2/2009 | Malik | H04L 51/066 709/206 |
| 2011/0167339 A1 | 7/2011 | Lemay | |
| 2012/0284639 A1* | 11/2012 | Yuniardi | G06Q 10/00 715/752 |

FOREIGN PATENT DOCUMENTS

| | | |
|---|---|---|
| CN | 102318294 | 1/2012 |
| CN | 102629182 | 8/2012 |
| EP | 2 315 176 | 4/2011 |
| EP | 2 393 265 | 12/2011 |

OTHER PUBLICATIONS

European Summons to Attend Oral Proceedings dated May 31, 2017 issued in Application No. 13191868.2.

* cited by examiner (a)

(b)

(d)

(a)

(b)

(c)

(c)

(a)

(a)

(b)

(a)

(b)

(c)

(d)

(a)

(b)

(a)

(e)

(f)

(a)

(c)

(d)

(a)

(b)

(c)

(d)

(b)

(c)

(a)

(c)

(d)

MOBILE TERMINAL, CONTROLLING METHOD THEREOF, AND RECORDING MEDIUM THEREOF

CROSS-REFERENCE TO RELATED APPLICATION

Pursuant to 35 U.S.C. § 119(a), this application claims the benefit of earlier filing date and right of priority to Korean Application No. 10-2012-0141764, filed on Dec. 7, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for switching a multimedia file inserted in a text of a message to an attachment file or inserting a multimedia file set as an attachment file in a text.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A mobile terminal has been traditionally used as a means for performing a communication with a different terminal. Recently, owing to the functional enlargements of a mobile terminal, the mobile terminal can communicate with other terminals through various paths including an instant message, an email and the like as well as a voice call and a text message.

In case of attempting to communicate with a different mobile terminal using such a message as a text message, an instant message, an email and the like, a user of a mobile terminal is able to send the message by inputting a text of a content to send to a counterpart or setting a file to send to a counterpart as an attachment file. Having received the message from the mobile terminal, the counterpart checks the inputted text and/or the attachment file attached to the message.

Yet, in case that the file to be sent to the counterpart is set as the attachment file, the counterpart has difficulty in checking a content of the attachment file because the attachment file should be saved in the mobile terminal of the counterpart and then executed manually.

Therefore, the demand for facilitating the attachment file content to be checked by the counterpart without setting the file to be sent to the counterpart as the attachment file is rising.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience is enhanced.

In particular, one object of the present invention is to provide a mobile terminal and controlling method thereof, by which a multimedia file set as an attachment file can be inserted in a text region of a message in a simple manner. Another object of the present invention is to provide a mobile terminal and controlling method thereof, by which a multimedia file inserted in a text region of a message can be set as an attachment file in a simple manner.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen configured to display an edit region for writing a message to transmit to at least one counterpart and an attach region for displaying an attachment file attached to the message and a controller configured to, while a multimedia file is displayed on the attach region by being set as the attachment file of the message, if the multimedia file displayed on the attach region is touched and dragged to the edit region, control the multimedia file to be displayed in a manner of being inserted in the edit region, and while the multimedia file is displayed in a manner of being inserted in the edit region, if the multimedia file displayed on the edit region is touched and dragged to the attach region, controlling the multimedia file to be set as the attachment file of the message.

In another aspect of the present invention, a method of controlling a mobile terminal according to the present invention may include the steps of displaying an edit region for writing a message to transmit to at least one counterpart and an attach region for displaying an attachment file attached to the message, while a multimedia file is displayed on the attach region by being set as the attachment file of the message, if the multimedia file displayed on the attach region is touched and dragged to the edit region, displaying the multimedia file in a manner that the multimedia file is inserted in the edit region, and while the multimedia file is displayed in a manner of being inserted in the edit region, if the multimedia file displayed on the edit region is touched and dragged to the attach region, setting the multimedia file as the attachment file of the message.

In a further aspect of the present invention, a computer-readable recording medium according to the present invention may include a mobile terminal controlling method having $1^{st}$ to $3^{rd}$ commands recorded therein, wherein the $1^{st}$ command is configured to display an edit region for writing a message to transmit to at least one counterpart and an attach region for displaying an attachment file attached to the message, wherein while a multimedia file is displayed on the attach region by being set as the attachment file of the message, if the multimedia file displayed on the attach region is touched and dragged to the edit region, the $2^{nd}$ command is configured to display the multimedia file in a manner that the multimedia file is inserted in the edit region, and wherein while the multimedia file is displayed in a manner of being inserted in the edit region, if the multimedia file displayed on the edit region is touched and dragged to the attach region, the 3$^{rd}$ command is configured to set the multimedia file as the attachment file of the message.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
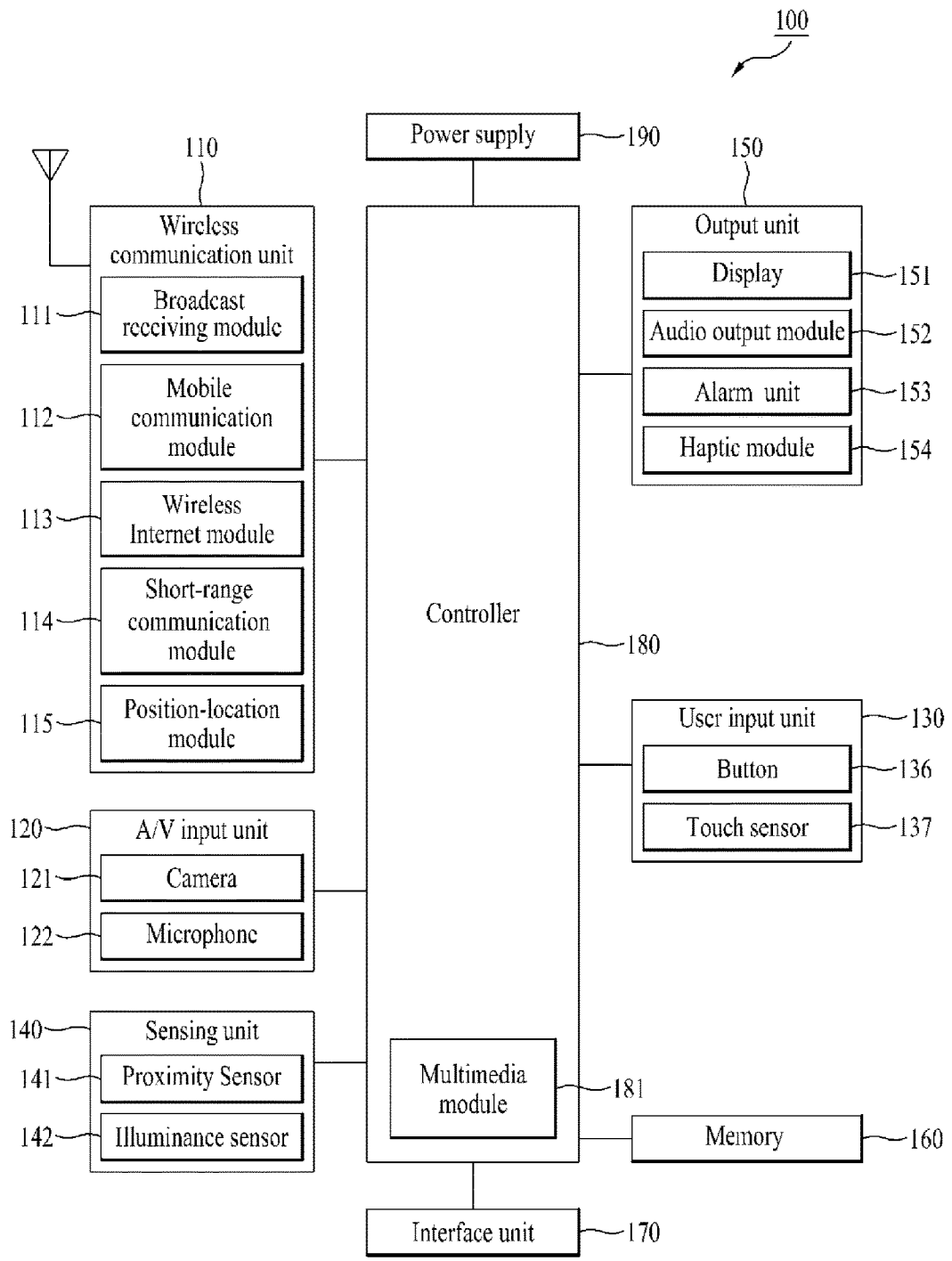
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
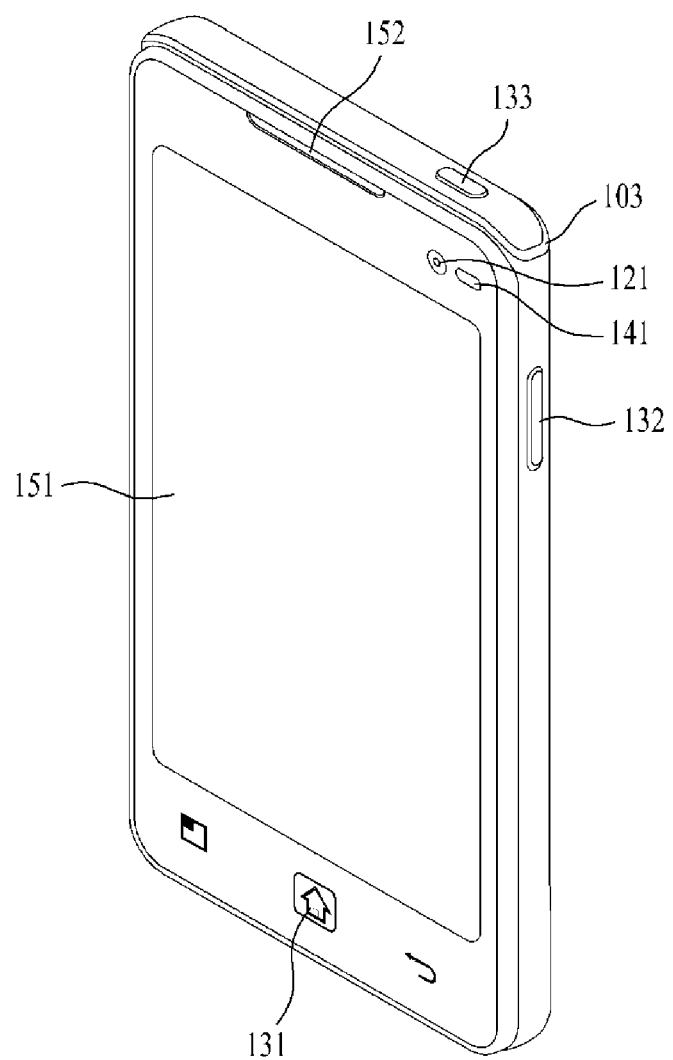
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touch-screen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
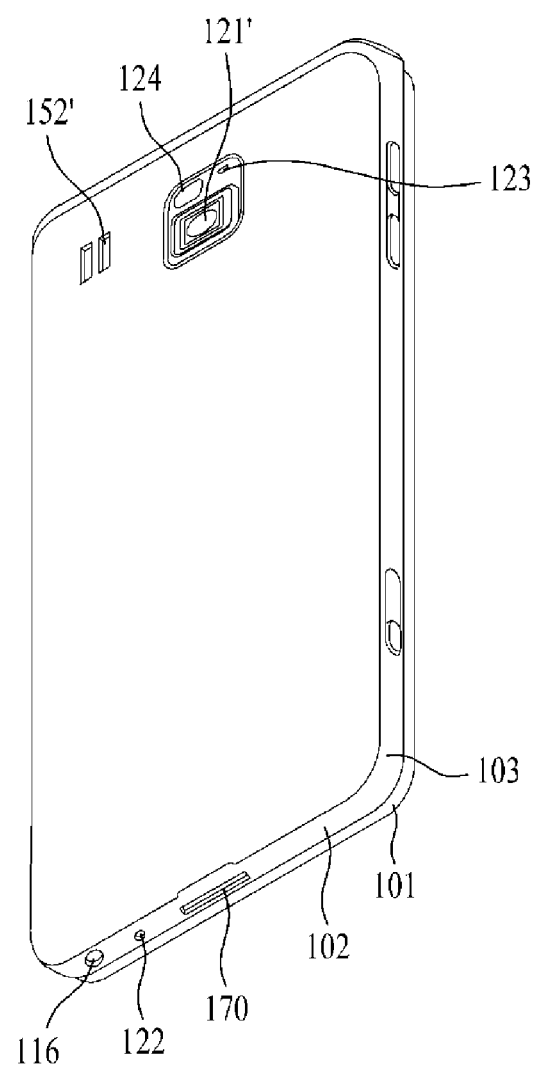
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal mentioned in the following description includes at least one of the components shown in FIG. 1. In particular, assume that a mobile terminal according to the present invention includes the display unit 151 and the controller 180. In more particular, an edit region for writing a message to send to at least one counterpart and an attach region for displaying an attachment file attached to the message are displayed on the display unit 151. When a multimedia file is set as the attachment file of the message and displayed on the attach region, if the multimedia file displayed on the attach region is touched and dragged to the edit region, the controller 180 controls the multimedia file to be displayed in a manner of being inserted in the edit region. When the multimedia file is displayed by being inserted in the edit region, if the multimedia file displayed on the edit region is touched and dragged to the attach region, the controller 180 sets the multimedia file as an attachment file of the message. Moreover, the mobile terminal according to the present invention may further include the wireless communication unit 110 for sending a message to a prescribed counterpart and the memory 160 configured to store a message.

'Message' mentioned in the description of the present invention may include data transceived with a prescribed counterpart using at least one of an email, a text message (e.g., SMS, LMS, MMS, etc.), a mobile messenger, an instant message using RCS (rich communication suite) and the like. For the facilitation of the accompanying drawings, assume that a type of a message includes an email.

'Multimedia file' mentioned in the description of the present invention includes at least one of an image file, a video file, a music file and a document file and may means a file that handles data of various types including image, video, music, text and the like. The multimedia file can be created and read by such a computing device as a mobile terminal mentioned in the description of the present invention. And, a document file may include such a file of every format for reading an application runnable through a mobile terminal as a phonebook file (e.g., a file of a vcard format), a schedule file linked to a schedule application and the like as well as a document file created through a processor. Moreover, the document file may include a webpage having URL address linked thereto.

'Touch drag' mentioned in the description of the present invention may mean an action of touching a prescribed object displayed on a touchscreen and then dragging & dropping the touched object onto a prescribed region. For instance, if A is touched and dragged to B, it may mean that an object A is touched and the dragged & dropped onto a region B. Moreover, if a prescribed object is 'touched', it may mean a user input for selecting the prescribed object by a touch input. In this case, 'touch' can be conceptionally understood as one of a simple contact touch, a long touch (i.e., maintaining a contact for prescribed duration), a proximity touch and the like.

A user input for 'touching' a prescribed object can be performed using a pointer. In this case, the pointer may mean such a body part or object, which is configured to touch a touchscreen, as a finger, a stylus pen and the like.

If a display module or unit of a mobile terminal according to the present invention includes a touchscreen, implementation of the following embodiments may be further facilitated. Therefore, the following description is made on the assumption that the display module or unit includes the touchscreen. If the display unit does not include the touchscreen, the mobile terminal according to the present invention may further include a separate input device configured to receive a user input.

In the following description, a mobile terminal according to the present invention is explained in detail with reference to an operational flowchart shown in FIG. 4. For clarity of the following description, a user intending to use a mobile terminal according to the present invention may be named 'user' and a user becoming a reception target of a message created through a mobile terminal according to the present invention or a terminal of the user may be named 'counterpart'.

Figure 4:
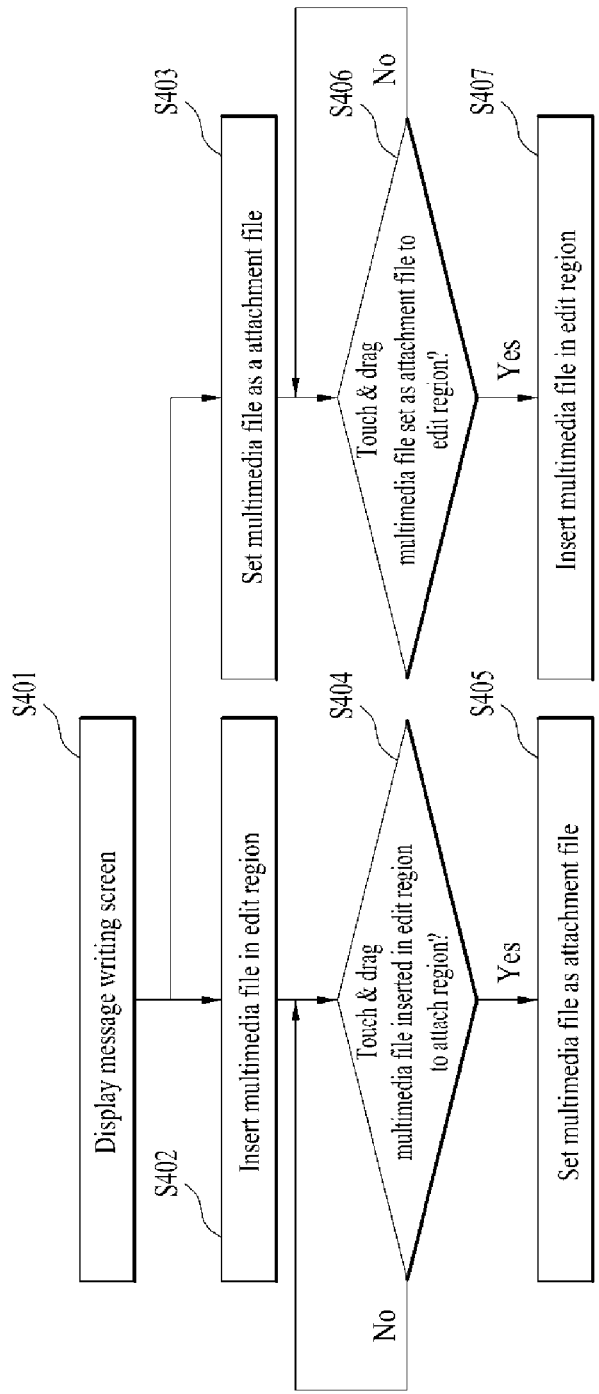
FIG. 4 is a flowchart for a method of controlling a mobile terminal according to the present invention.

FIG. 4 is a flowchart for a method of controlling a mobile terminal according to the present invention.

Referring to FIG. 4, in case that a user intends to send a message to a prescribed counterpart, the controller 180 can control the touchscreen to display a message writing screen [S401]. When the message writing screen is displayed on the touchscreen, the controller 180 can control the message writing screen to include an edit region for writing a text of the message to be sent to the prescribed counterpart and an attach region for displaying information of an attachment file attached to the message. The edit region and the attach region shall be described in detail with reference to FIG. 5 as follows.

Figure 5:
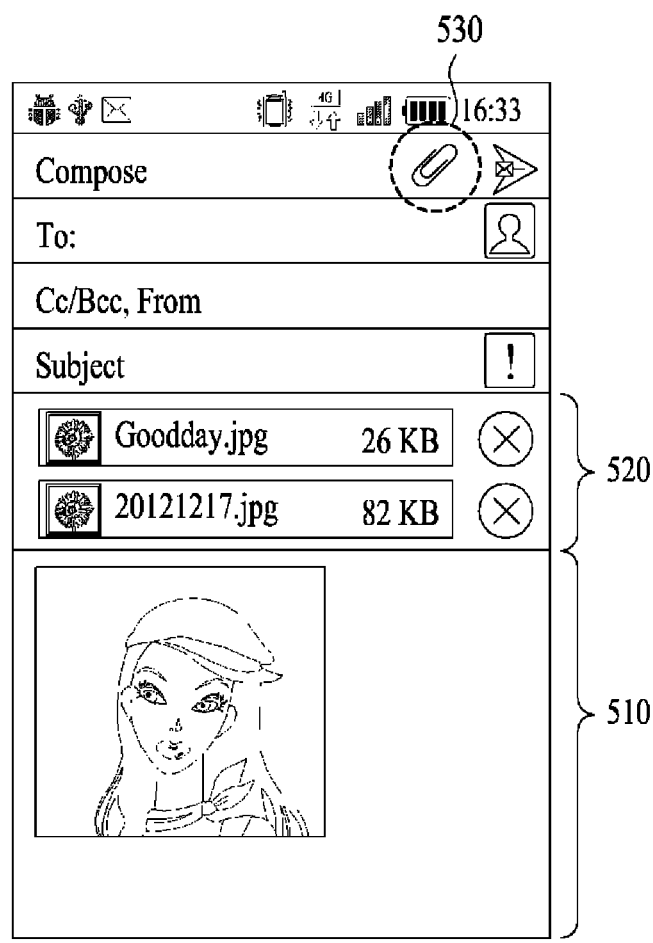
FIG. 5 is a diagram for one example to describe a message writing screen.
Figure 6A:
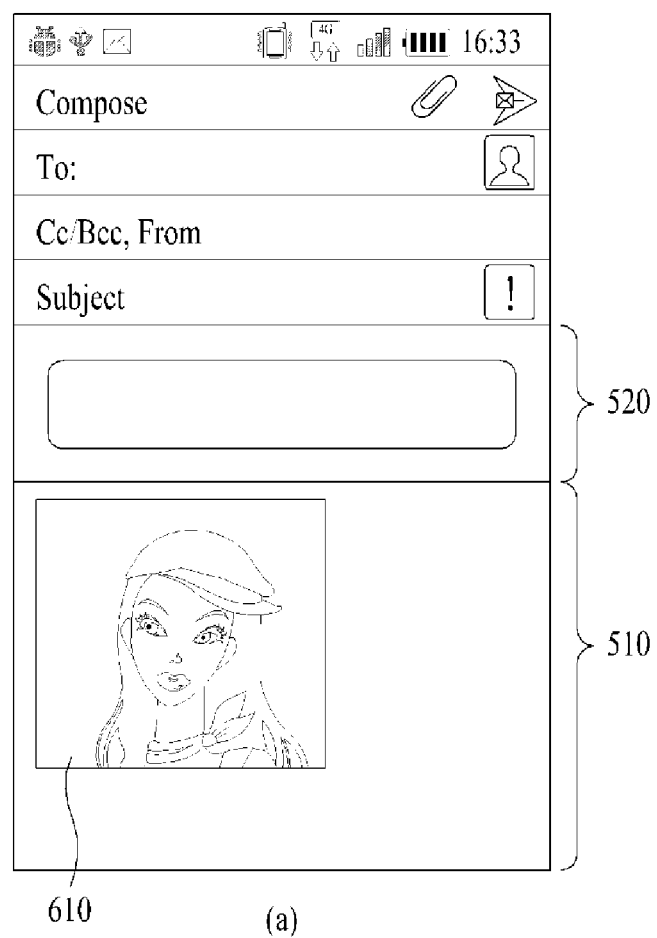
FIGS. 6a to 6f are a diagram for one example to describe an output of a touchscreen if a multimedia file is inserted in an edit region.
Figure 6B:
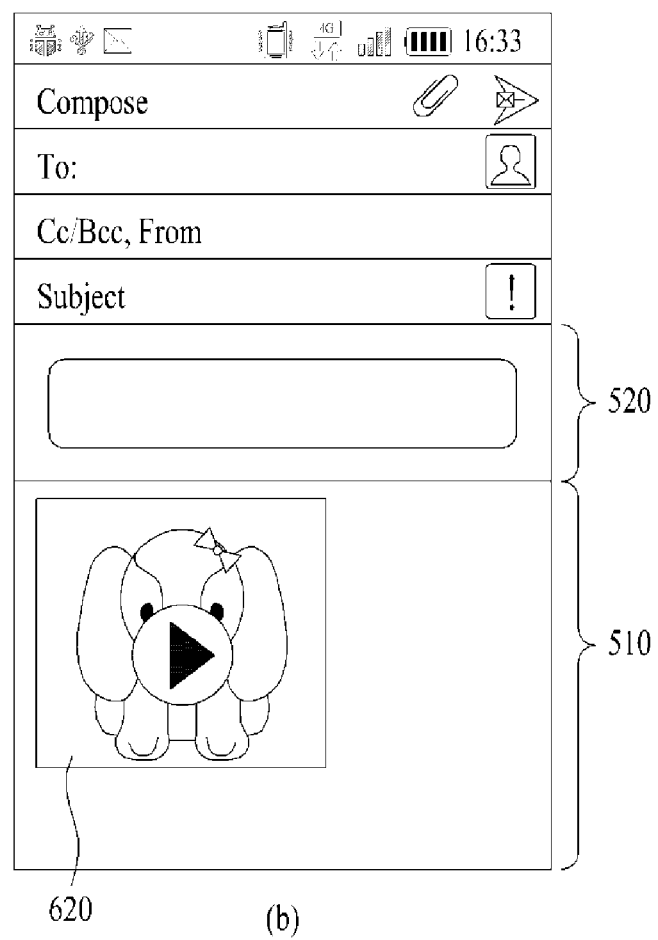
Figure 6C:
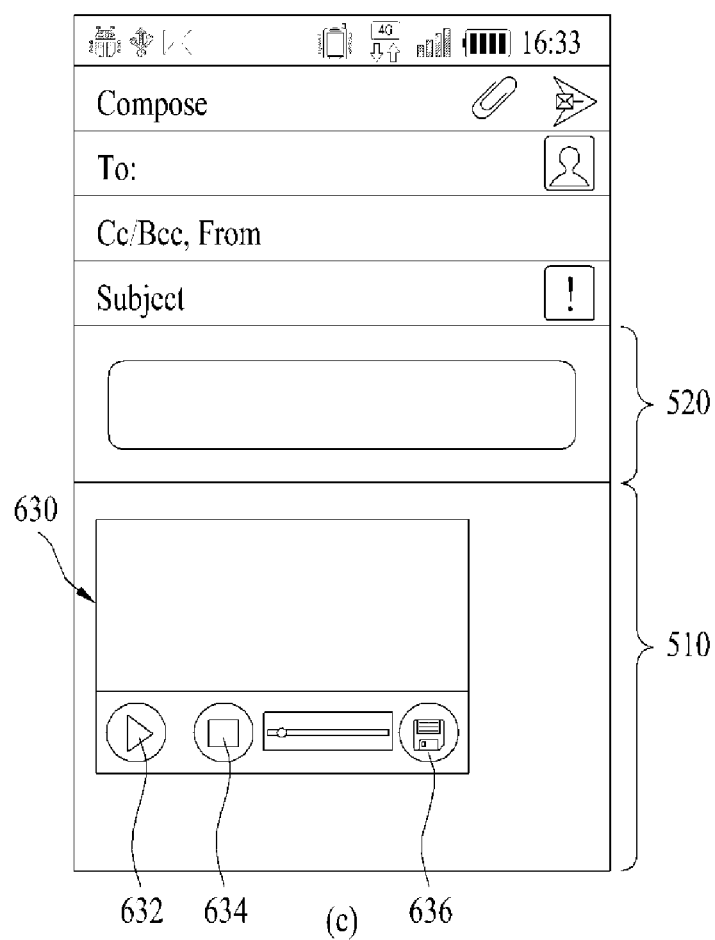
Figure 6D:
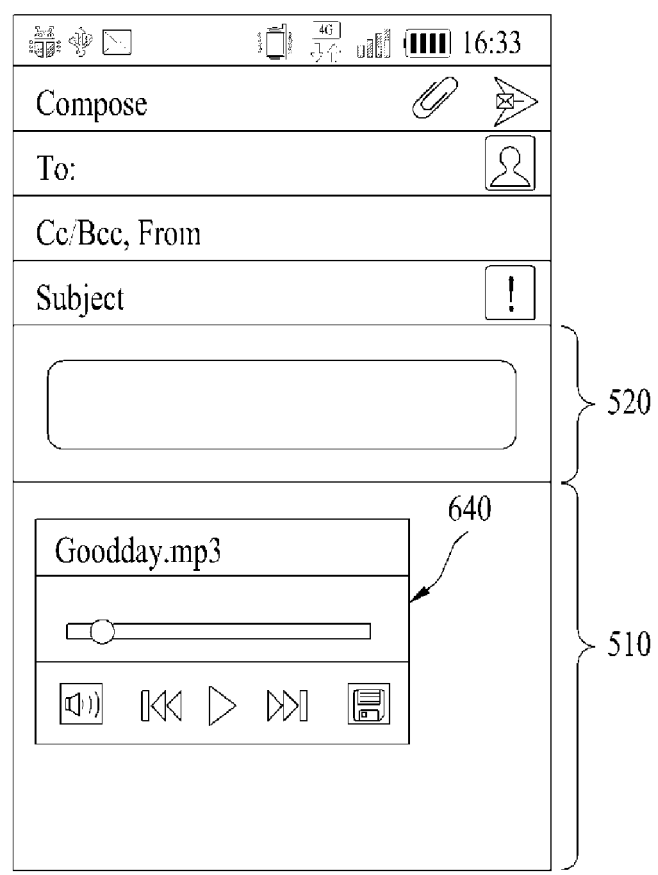
Figure 6E:
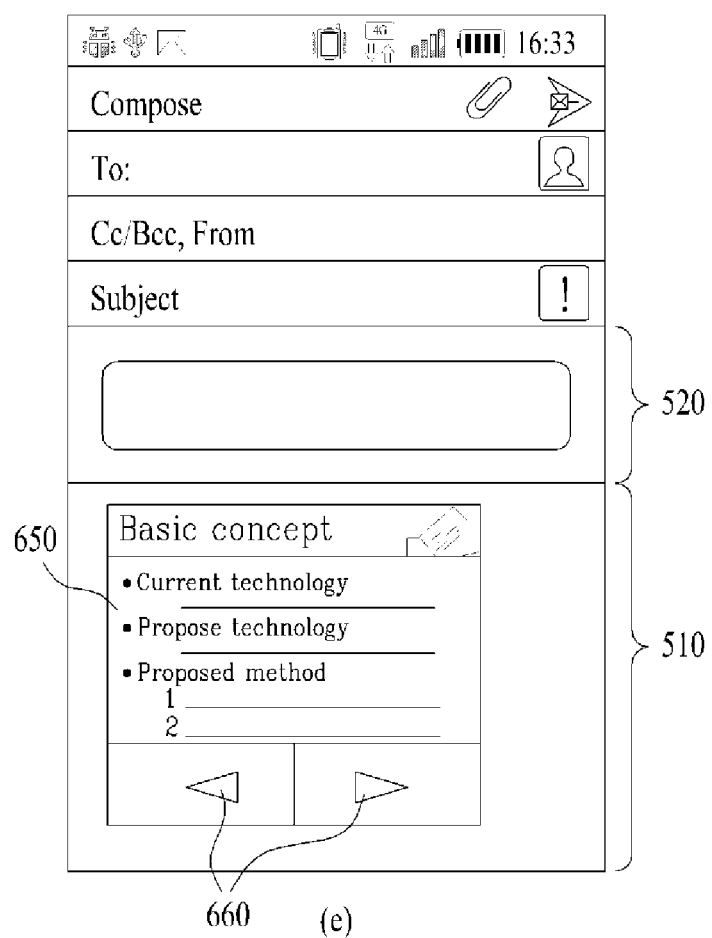
Figure 6F:
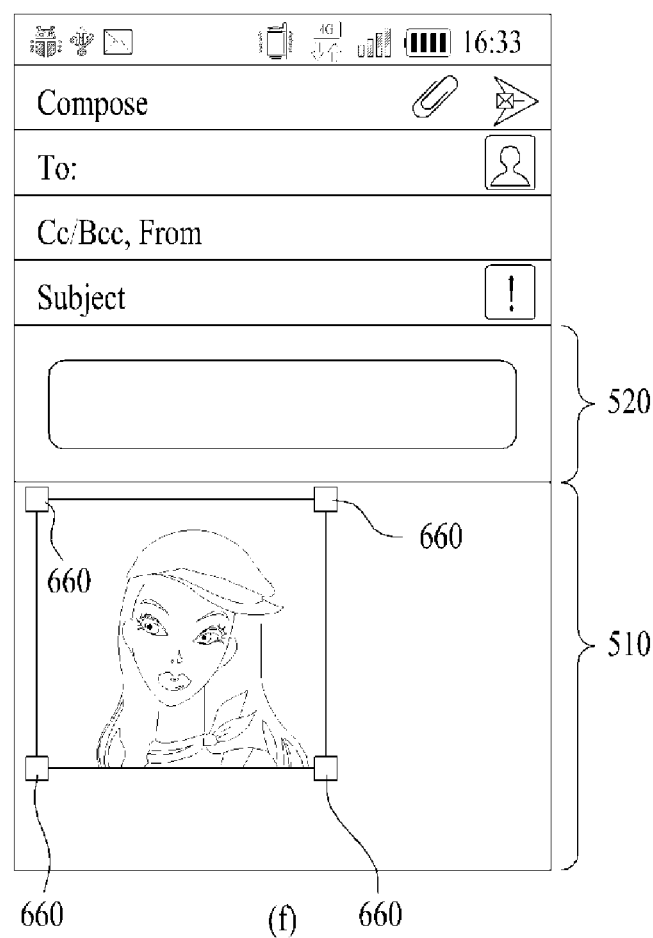
Figure 7A:
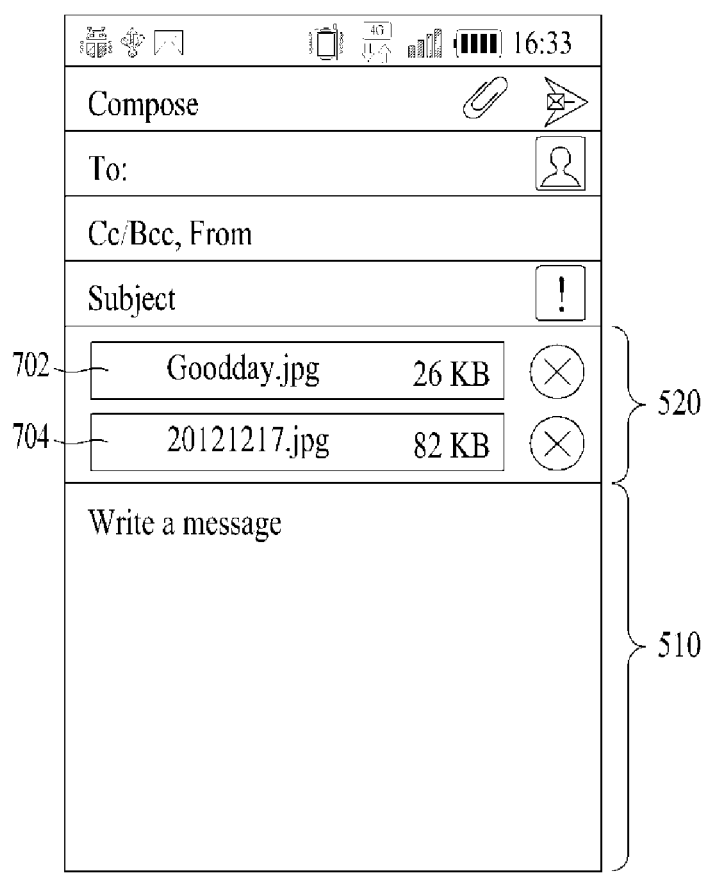
FIGS. 7a to 7f are a diagram for one example to describe a process for displaying an information of an attachment file on an attachment region.
Figure 7B:
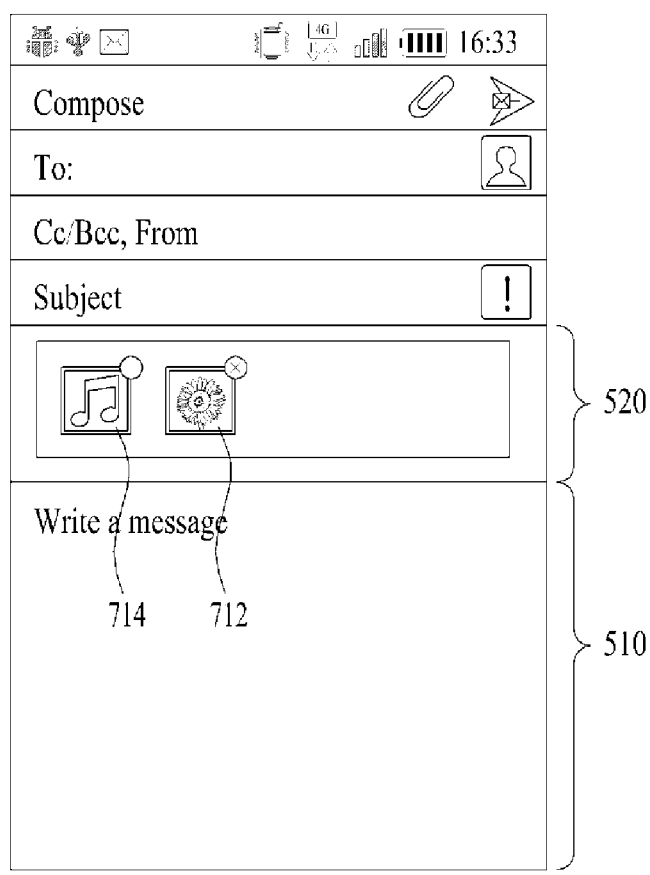
Figure 7C:
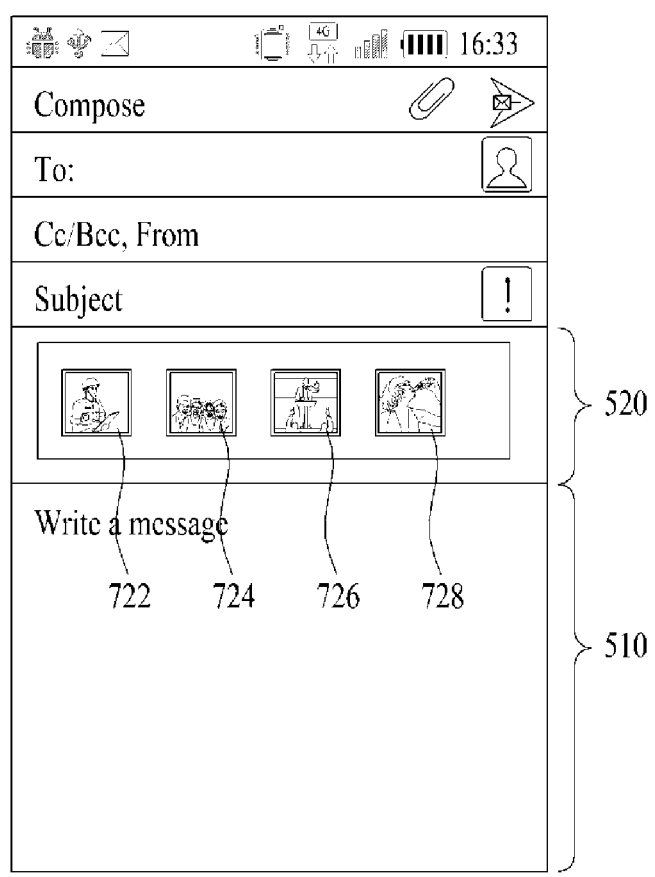
Figure 7D:
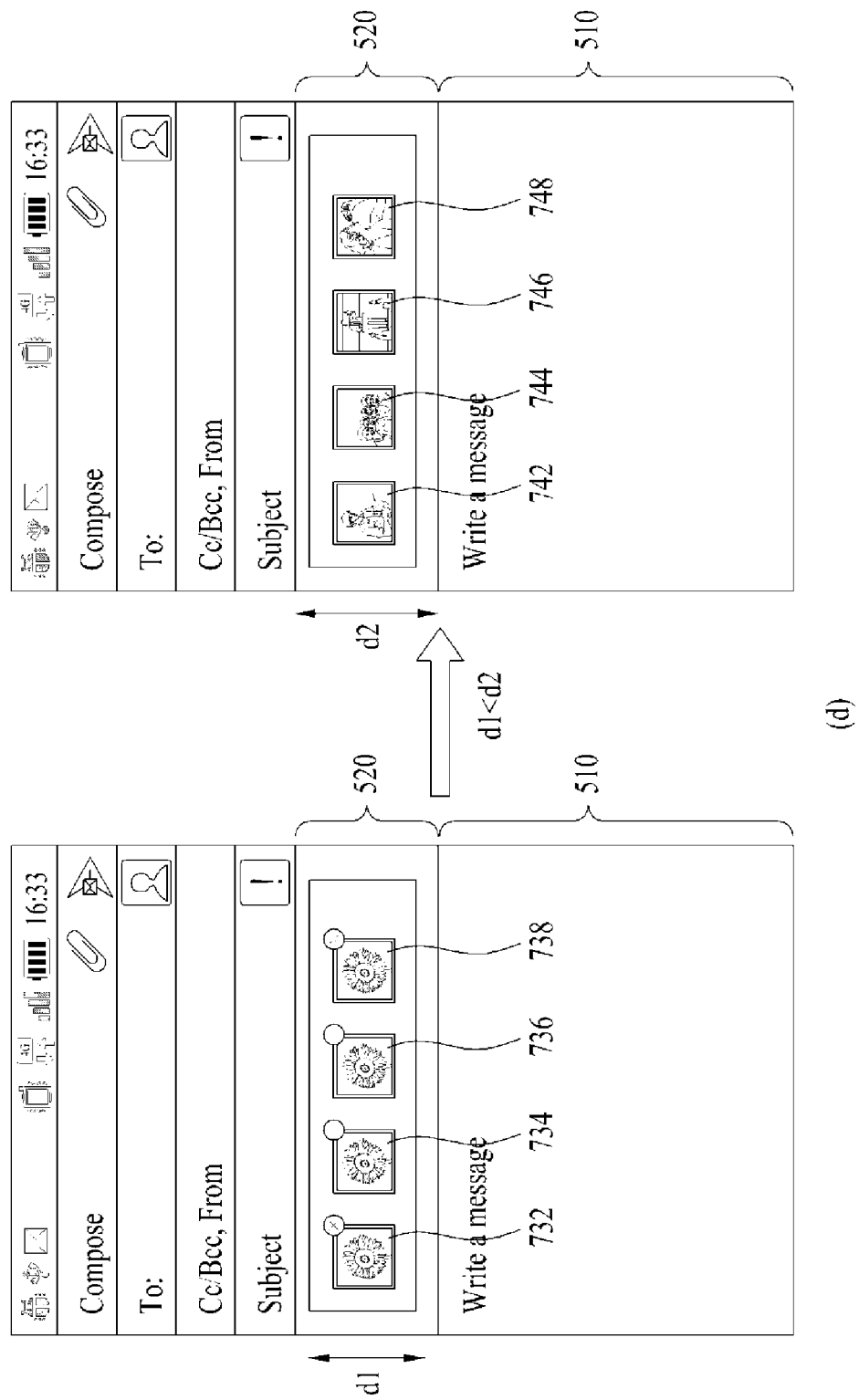
Figure 7E:
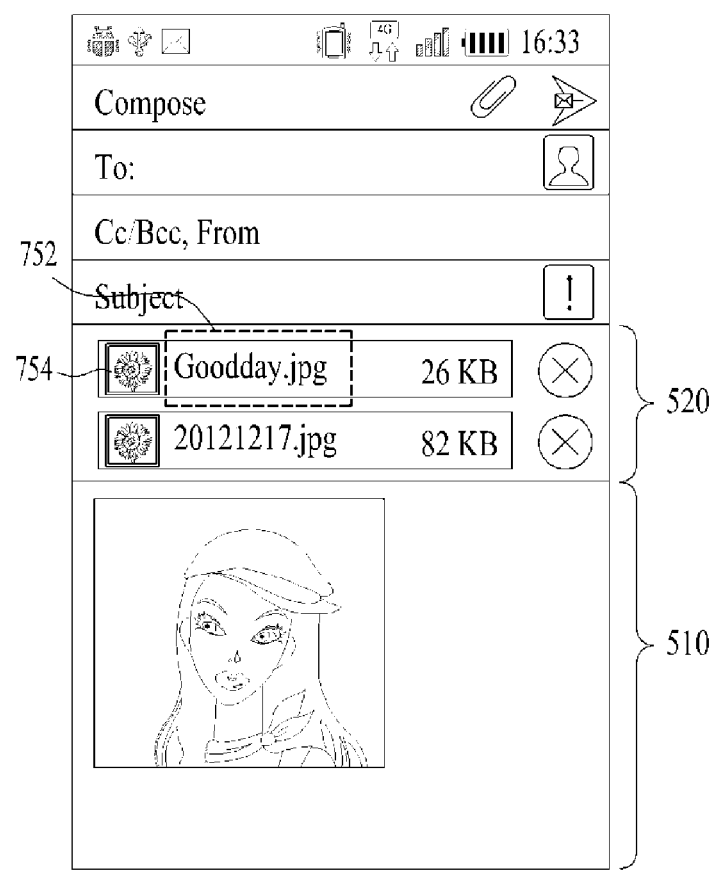
Figure 7F:
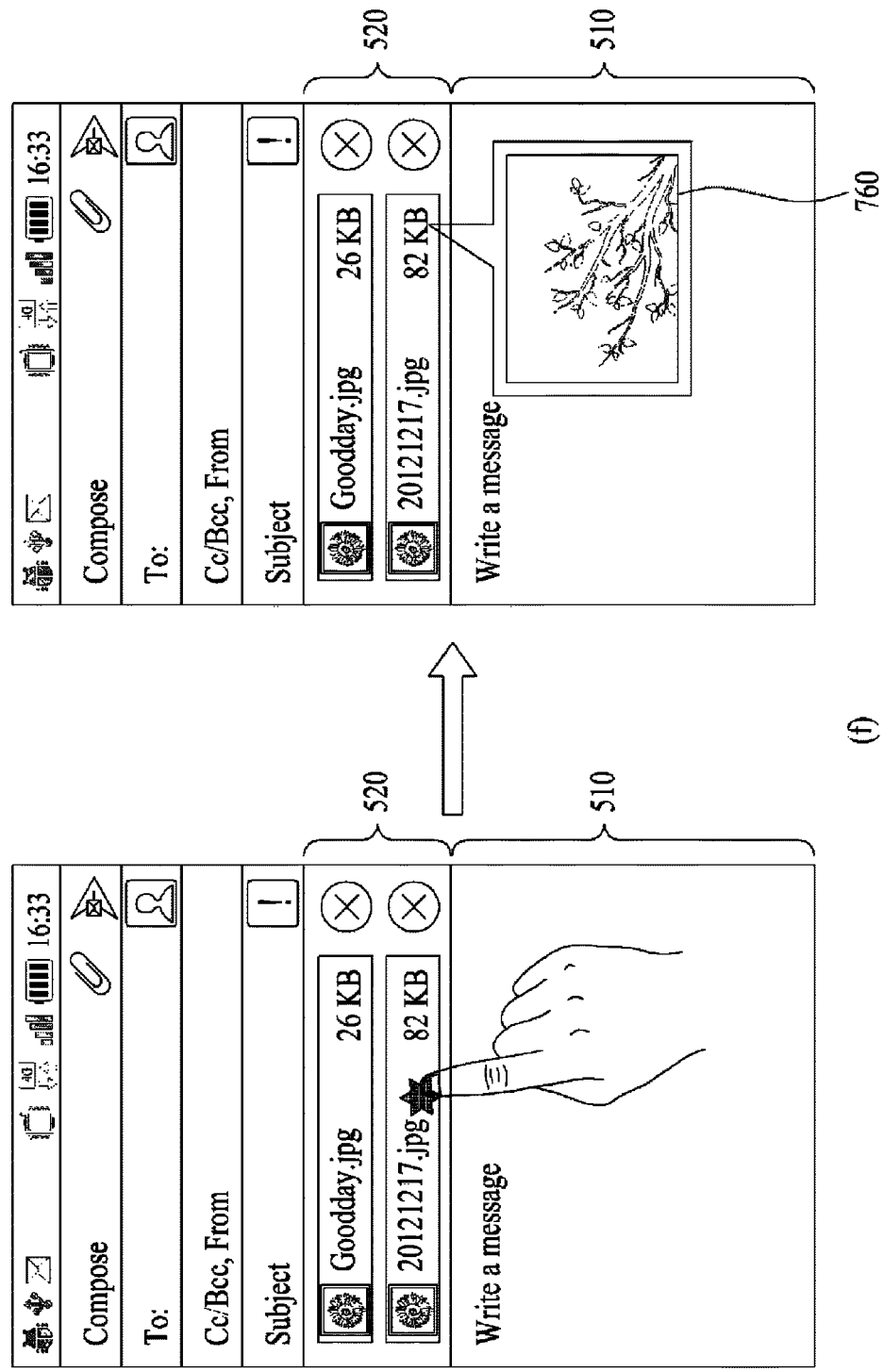
Figure 8A:
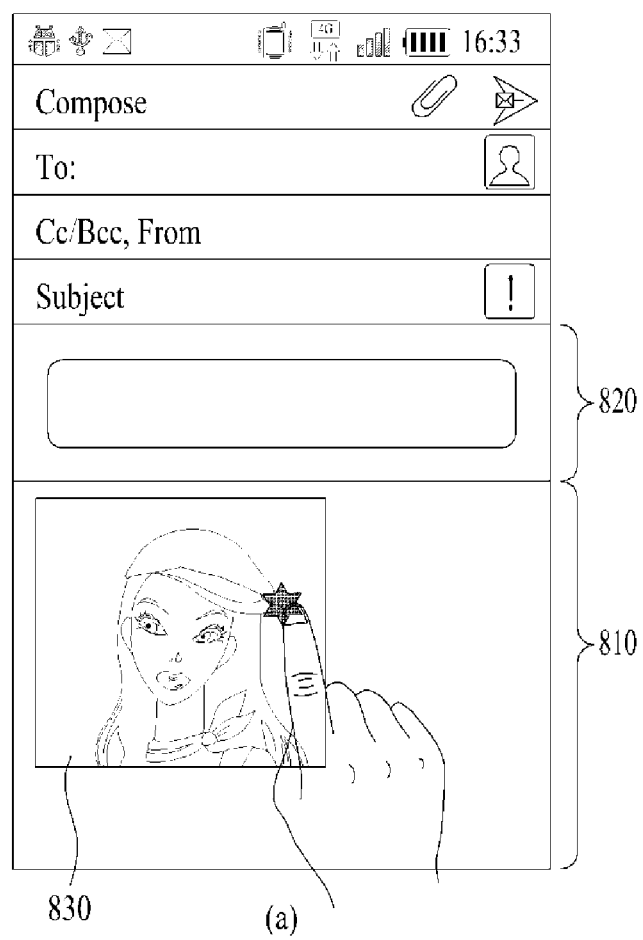
FIGS. 8a to 8d are a diagram for one example to describe a process for setting a multimedia file inserted in an edit region as an attachment file.
Figure 8B:
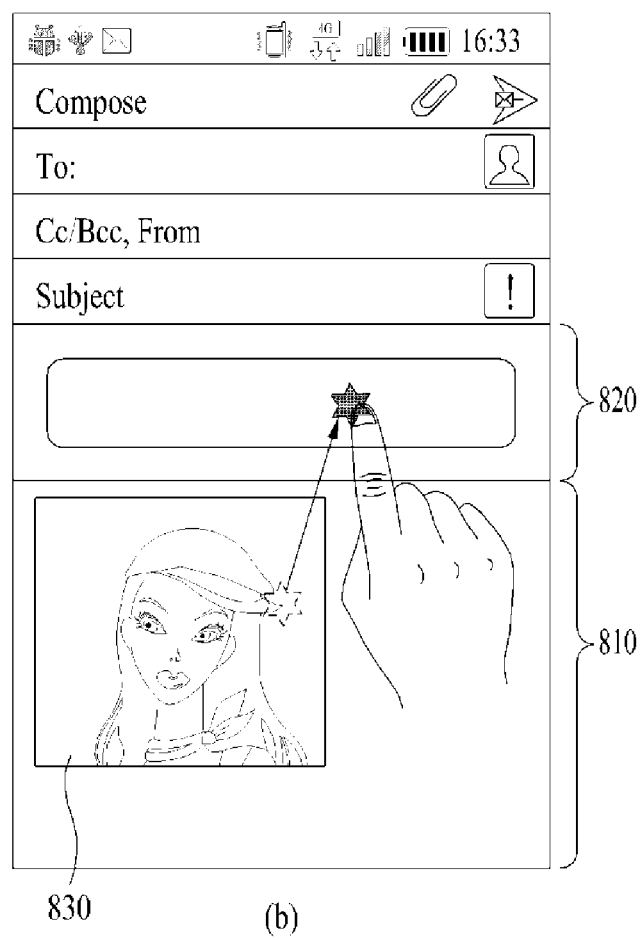
Figure 8C:
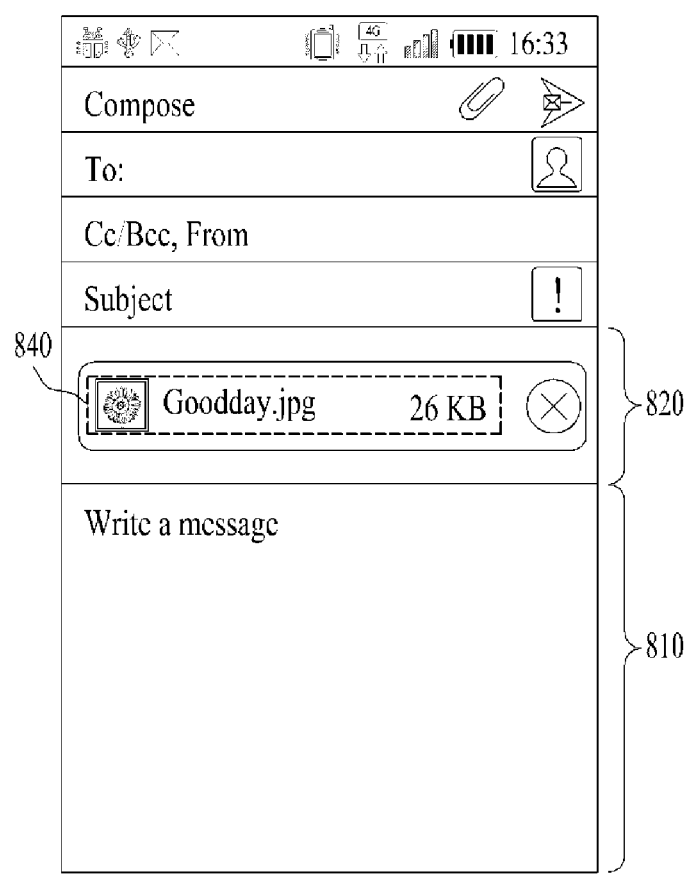
Figure 8D:
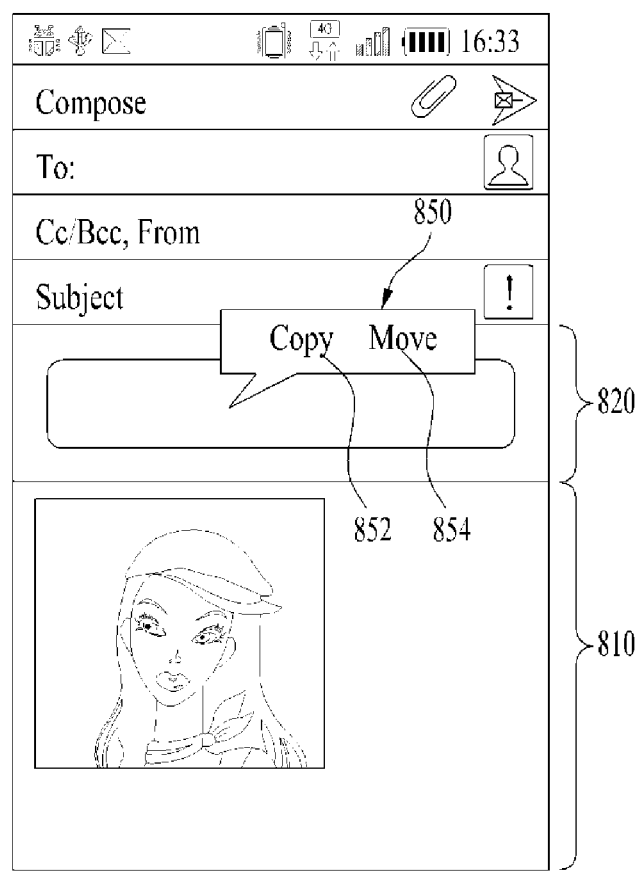

FIG. 5 is a diagram for one example to describe a message writing screen.

Referring to FIG. 5, the controller 180 can control a message writing screen, which includes an edit region 510 for inputting a text of a message and an attach region 520 for displaying information of an attachment file attached to the message, to be displayed on the touchscreen.

The edit region 510 is provided to input a text content of a message. And, a user can input a text content, which is to be sent to a prescribed counterpart, to the edit region 510. In particular, the controller 180 can display a text on the edit region 510 based on a user input or can insert such a multimedia file as an image, a video, a music, a document and the like in the edit region 510. In case that a multimedia file is inserted in the edit region 510, the controller 180 controls the multimedia file or a control panel, which is provided to control a playback of the multimedia file, to be displayed depending on a type of the inserted multimedia file. If the multimedia file is displayed on the edit region 510, it may mean that a content of the multimedia file is displayed on the edit region 510. In this case, the content of the multimedia file can include one of an image, a thumbnail of video, a document file preview and the like depending on a type of the multimedia file. In case that a multimedia file is inserted in the edit region 510, an output of the touchscreen is described with reference to FIG. 6 as follows.

FIG. 6 is a diagram for one example to describe an output of a touchscreen if a multimedia file is inserted in an edit region.

FIG. 6 (a) shows one example of a case that an image file 610 is inserted in an edit region 510. Referring to FIG. 6 (a), if the image file 610 is inserted in the edit region 510, the controller 180 can control the inserted image file 610 to be displayed on the edit region 510. Hence, if the image file 610 is inserted in the edit region 510, a counterpart receives a message from the mobile terminal and is then able to directly check a content of the image file 610 through a text content of the message. In case that the image file 610 is inserted in the edit region 510, a display size of the image file 610 can be automatically adjusted depending on a resolution or image size of the image file 610. Optionally, the image size of the image file 610 can be manually adjusted according to the example shown in FIG. 6 (f).

In case that the image file 610 is displayed on the edit region 510, the controller 180 can control a thumbnail of the image file 610 to be displayed on the edit region 510. If the thumbnail of the image file 610 in the edit region 510 is touched, the controller 180 can control an original image file 610 to be displayed.

FIG. 6 (b) and FIG. 6 (c) show examples of inserting a video file in the edit region 510. If a video file is inserted in the edit region 510, the controller 180 may control a still cut 620 in a specific view of the inserted video file to be displayed [FIG. 6 (b)]. Alternatively, if a video file is inserted in the edit region 510, the controller 180 may control a control panel 630, which is provided to control a playback of an inserted video, to be displayed [FIG. 6 (c)]. In this case, the control panel 630 may include at least one of a play/pause button 632 and a stop button 634 to control the playback of the video file. Moreover, the control panel 630 may further include a save button 636 for saving the video file, which is inserted in the edit region 510, as a file.

If the video file is inserted in the edit region 510, a counterpart having received a message from the mobile terminal can touch a still cut displayed on a text of the message or play the video file using the control panel displayed on the text. Moreover, the counterpart can save the video file inserted in the text through a save button of the control panel in a manner of separating the video file from the message.

FIG. 6 (d) shows one example of a case that a music file is inserted in the edit region 510. Referring to FIG. 6 (d), if a music file is inserted in the edit region 510, the controller 180 can control a control panel 640, which is provide to control a playback of the inserted music file, to be displayed. If the music file is inserted in the edit region 510, a counterpart having received a message from the mobile terminal can play the music file using the control panel 640 displayed on a text. Moreover, the counterpart can save the music file inserted in the message through a save button of the control panel 640 in a manner of separating the music file inserted in the message from the message.

FIG. 6 (e) shows one example of a case that a document file is inserted in the edit region 510. Referring to FIG. 6 (e), if a document file is inserted in the edit region 510, the controller 180 can control a preview 650 of the document file to be displayed. In particular, if the document file includes a plurality of pages, the controller 180 images a prescribed page of the document file and can control a preview 650 of the document file to be displayed on the touchscreen. Furthermore, the controller 180 can control a page turn button 660 to be further displayed, as shown in FIG. 6 (e), to enable the pages of the document file to be turned.

Although FIG. 6 (e) shows one example that a prescribed page of the document file including a plurality of pages is outputted as the preview 650, it is able to control a plurality of pages to be simultaneously outputted as a preview unlike the example shown in FIG. 6 (e).

In case that a document file is inserted in the edit region 510, a counterpart having received a message from the mobile terminal can check the document file through the preview 650. If the page turn button 660 is displayed on a text, the counterpart can perform an action of turning a page of the document file displayed as the preview 650 using the page turn button 660.

Instead of the page turn button 660 shown in FIG. 6 (e), the controller 180 can control a page turning action of turning a page of the document file to be performed based on a touch input applied to the preview 650 of the document file. For instance, if a flicking touch with a pointer in a 1$^{st}$ direction is performed on the preview 650 of the document file, the controller 180 can control a next page to be displayed. For another instance, if a flicking touch with a pointer in a 2$^{nd}$ direction is performed on the preview 650 of the document file, the controller 180 can control a previous page to be displayed.

A display size and location of a multimedia file or a control panel for controlling a playback of the multimedia file, which is displayed on the edit region 510, can be arbitrarily changed by user settings. For instance, if a prescribed touch input is applied to an image file displayed in a manner of being inserted in the edit region 510, referring to FIG. 6 (f), the controller 180 can control a handler 660, which is provided to adjust a size of the image file, to be displayed. In particular, a user can adjust a display location of the image file by dragging the image file or can adjust a size of the image file displayed on the edit region 510 by dragging the handler.

Meanwhile, the attach region 520 shown in FIG. 5 is the region for displaying information of an attachment file attached to a message.

The controller 180 can set the multimedia file selected by the user input as the attachment file of the message. For instance, a user can complete the settings of the attachment file in a manner of touching the file attach button 530 and then selecting the multimedia file intended to be set as the attachment file by the user.

If the attachment file is selected by the user input, the controller 180 can control the information of the attachment file set as the attachment file to be displayed on the attach region 520. In this case, the information of the attachment file may include at least one of a file name of the attachment file, an icon corresponding to a type of the attachment file, a preview of the attached multimedia file, and a size of the attached multimedia file. A process for displaying the information of the attachment file on the attach region 520 is described in detail with reference to FIG. 7 as follows.

FIG. 7 is a diagram for one example to describe a process for displaying an information of an attachment file on an attachment region.

For instance, referring to FIG. 7 (a), the controller 180 can control file names 702 and 704 of attachment files to be displayed on an attach region 520. A user is then able to identify files attached to a message using the file names 702 and 704 of the attachment files.

For another instance, referring to FIG. 7 (b), the controller 180 can control an icon corresponding to a type of an attached multimedia file to be displayed on the attach region 520. For example, if multimedia files set as the attachment files include an image file and a music file, as shown in FIG. 7 (b), the controller can control an image icon 712 and a music icon 714, which indicate that the attached files are the image file and the music file, respectively, to be displayed on the attach region 520. For another example (not shown in the drawing), if the attached multimedia file includes a video file, a video icon may be displayed on the attach region 520. For another example (not shown in the drawing), if the attached multimedia file includes a document file, a document icon may be displayed on the attach region 520.

If the attachment files set as the attachment files include image files and/or video files, referring to FIG. 7 (c), the controller 180 can control thumbnails 722, 724, 726 and 728 of the attached image and/or video files to be displayed on the attach region 520. If the attachment file includes a file that is neither an image file nor a video file, as shown in FIG. 7 (b), the controller 180 may control an icon corresponding to a type of the attachment file to be displayed.

The controller 180 can adjust information of a multimedia file displayed on the attach region 520 depending on a display size of the attach region 520. For instance, referring to FIG. 7 (d), while icons 732, 734, 736 and 738 corresponding to types of attached multimedia files are displayed, if a size of the attach region 520 is increased by a user input, the controller 180 can control thumbnails 742, 744, 746 and 748 to be displayed on the attach region 520. In the state shown in FIG. 7 (d), if the size of the attach region 520 is further increased, the controller 180 can control a size of each of the thumbnails displayed on the attach region 520 to further increase.

Moreover, the controller 180 can control a combination of at least two of a file name of an attachment file, an icon corresponding to a type of the attachment file and a preview of the attachment file to be displayed on the attach region 520. For instance, referring to FIG. 7 (e), the controller 180 can control a file name 752 of an attached multimedia file and a corresponding icon 754 to be simultaneously displayed on the attach region 520.

For another instance, when a multimedia file set as an attachment file includes an image/video file, if the image/video file displayed on the attach region 520 is selected by a touch input, the controller 180 can control a thumbnail of the selected image/video file to be displayed in response to the touch input.

For instance, if a prescribed touch input is applied to an information of an image file displayed on the attach region 520, referring to FIG. 7 (f), the controller 180 can control a popup window 760, which is provided to display a thumbnail of a selected image file, to be displayed. If the prescribed touch input includes a long touch, the controller 180 can control the popup window 760, on which the thumbnail of the selected image file is displayed, to be displayed only if a pointer maintains its contact. For another instance, the controller 180 discriminates a simple contact touch and a proximity touch from each other. Subsequently, if the simple contact touch is performed on the information of the image file, the controller 180 activates the selected image file. If the proximity touch is performed on the information of the image file, the controller 180 can control the popup window 760, on which the thumbnail of the selected image file is displayed, to be displayed.

In the above-described examples, a multimedia file is set as an attachment file. Yet, it is not mandatory for a multimedia file to be set as an attachment file. For instance, files in other formats failing to be determined as multimedia files may be set as attachment files of a message [not shown in the drawing].

In case that a multimedia file is inserted in the edit region 510, as mentioned in the foregoing description of the example shown in FIG. 6, the multimedia file inserted in a text of a message or a control panel for playing the inserted multimedia file can be displayed. In this case, a counterpart having received a message from the mobile terminal according to the present invention can simultaneously perform both one action of checking the message text and another action of checking the inserted multimedia file.

On the contrary, if a multimedia file is set as an attachment file and then displayed on the attach region 520, a counterpart having received a message saves the attachment file and is then able to check the multimedia file by activating the saved attachment file. Yet, in case that the attachment file is an image file or a video file, a message text content and a preview of the attachment file may be exceptionally displayed at the same time.

In FIG. 5, the region for displaying the information of the attachment file is defined as the attach region 520. Yet, according to another embodiment of the present invention, the display region of the file attach button for setting attachment files can be understood as included in the attach region 520 in the example shown in FIG. 5.

Referring now to FIG. 4, the controller 180 inserts a multimedia file in the edit region [S402] or sets the multimedia file as an attachment file [S403], based on the user input.

If the multimedia file is inserted in the edit region, as mentioned in the foregoing description of the example shown in FIG. 6, the controller 180 can control the multimedia file or a control panel, which is provided to control a playback of the multimedia file, to be displayed on the edit region. On the other hand, if the multimedia file is set as the attachment file, as mentioned in the foregoing description of the example shown in FIG. 7, the controller 180 can control information of the attachment file to be displayed on the attach region.

While the multimedia file is inserted in the edit region, if the multimedia file inserted in the edit region is touch-dragged to the attach region, the controller 180 can control the multimedia file to be set as the attachment file [S404]. In case that the multimedia file previously inserted in the edit region is set as the attachment file, it may be deleted form the edit region or remain in the edit region as it is. Yet, in order to prevent a redundant transmission of the same data, the multimedia file set as the attachment file may be preferably deleted from the edit region.

In the following description, a process for setting a multimedia file inserted in an edit region as an attachment file is explained in detail with reference to FIG. 8.

FIG. 8 is a diagram for one example to describe a process for setting a multimedia file inserted in an edit region as an attachment file. For clarity of the following description, assume that a multimedia file inserted in an edit region 810 includes an image file.

Referring to FIG. 8, if an image file 830 is inserted in an edit region 810, the controller 180 can control the image file 830 to be displayed on the edit region 810 [FIG. 8 (*a*)]. Subsequently, if the image file inserted in the edit region 810 is touched and then dragged to an attach region 820 [FIG. 8 (*b*)], the controller 180 sets the touch-dragged image file as an attachment file and is then able to control an information 840 of the image file set as the attachment file to be displayed on the attach region 820 [FIG. 8 (*c*)].

In case that the multimedia file previously inserted in the edit region 810 is set as the attachment file, the multimedia file displayed on the edit region 810 may be deleted form the edit region 810 or remain in the edit region 810 as it is. According to one embodiment of the present invention, referring to FIG. 8 (*d*), the controller 180 can control a popup window 850, which is provided to adjust whether to maintain the image file in the edit region 810, to be displayed before setting the image file as the attachment file. If a 'copy' region 852 is touched in the popup window 850 shown in FIG. 8 (*d*), the controller 180 can control the image file to be set as the attachment file by maintaining the image file in the edit region 810. On the other hand, if a 'move' region 854 in the popup window 850 is touched, the controller 180 can control the image file to be set as the attachment file by deleting the image file from the edit region 810.

Although FIG. 8 shows one example that the multimedia file includes the image file, the description with reference to FIG. 8 can be exactly applied to such a multimedia file as a music file, a document file, a video file and the like. In particular, if the music/document/video file displayed on the edit region 810 is touched and dragged to the attach region 820, the music/document/video file can be set as an attachment file as well.

In the example shown in FIG. 8, if the multimedia file displayed on the edit region 810 is touched and dragged to the attach region 820, the multimedia file is set as the attachment file. Unlike the example shown in FIG. 8, if a file attach button within the attach region 820 is touched and dragged to a multimedia file displayed on the edit region 810, the controller 180 may control the multimedia file inserted in the edit region 810 to be set as an attachment file. This is described in detail with reference to FIG. 9 as follows.

Figure 9A:
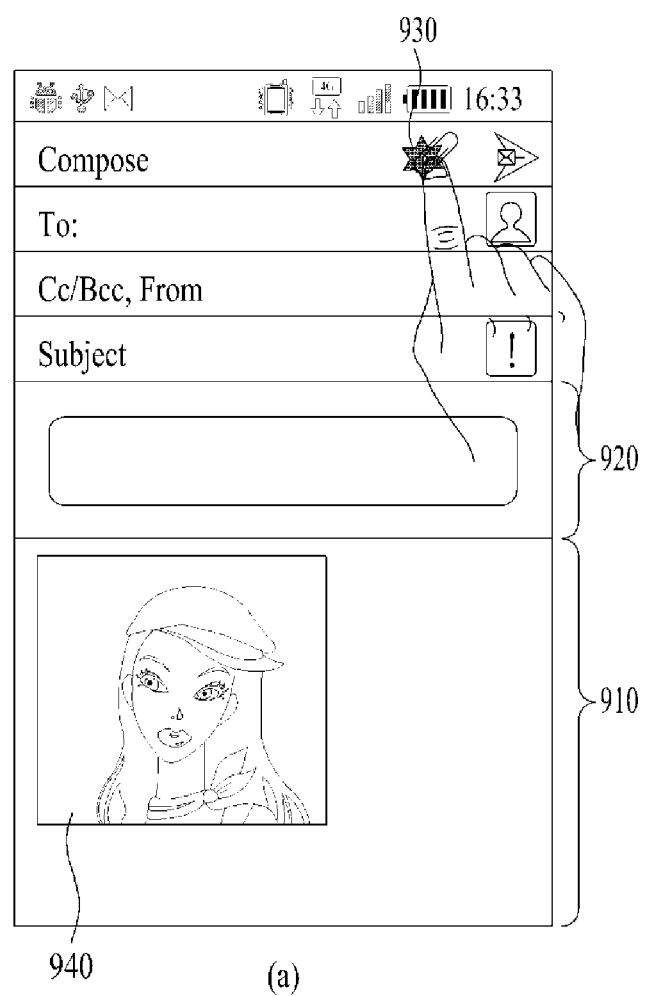
FIGS. 9a to 9c are a diagram for another example to describe a process for setting a multimedia file inserted in an edit region as an attachment file.
Figure 9B:
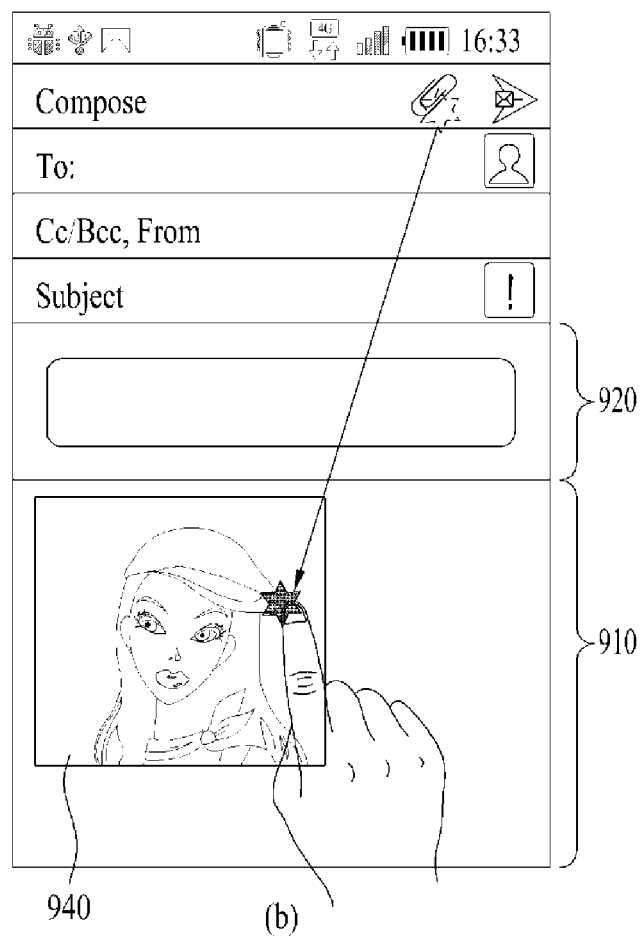
Figure 9C:
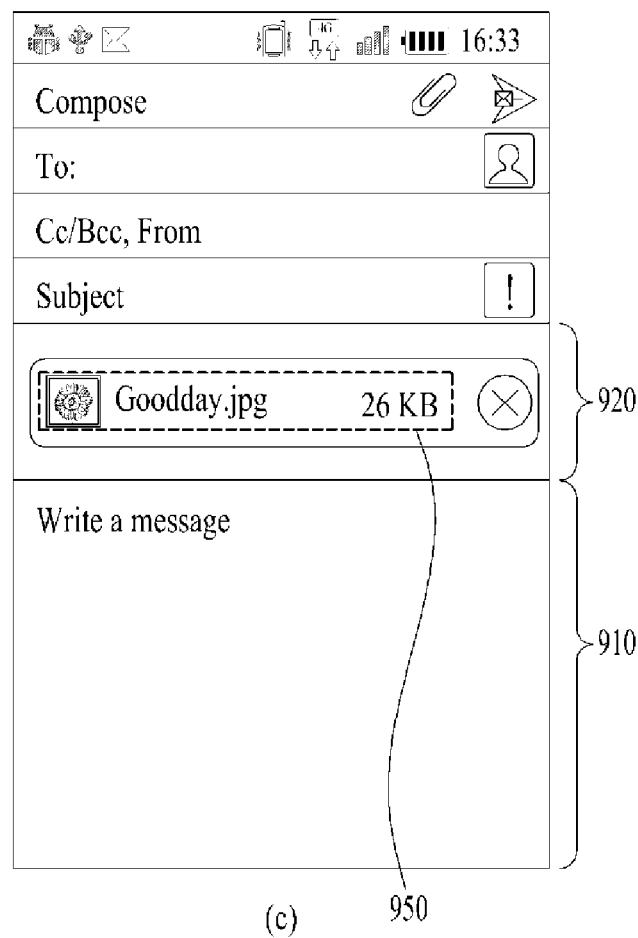

FIG. 9 is a diagram for another example to describe a process for setting a multimedia file inserted in an edit region as an attachment file. Like the former assumption made for FIG. 8, assume that a multimedia file inserted in an edit region 910 includes an image file.

Referring to FIG. 9, after a file attach button 930 of an attach region 920 has been touched [FIG. 9 (*a*)], if the file attach button 930 is dragged to an image file 940 displayed on an edit region 910 [FIG. 9 (*b*)], the controller 180 sets the multimedia file inserted in the edit region 910 to be set as an attachment file and is then able to control an information 950 of the multimedia file set as the attachment file to be displayed on the attach region 920 [FIG. 9 (*c*)].

In particular, on the contrary to the former example shown in FIG. 8, if a drag input from an attach region to an edit region is applied, a multimedia file inserted in the edit region can be set as an attachment file.

Like the example shown in FIG. 8, the description with reference to FIG. 9 can be exactly applied to such a multimedia file as a music file, a document file, a video file and the like as well as to an image file.

In setting a multimedia file inserted in an edit region as an attachment file, the controller 180 may set an original copy of the multimedia file inserted in the edit region as the attachment file as well. Moreover, like the example shown in FIG. 6 (*f*), if a size of a multimedia file (particularly, an image file) is adjusted by a user, it is able to control the size-adjusted image file to be set as an attachment file. For instance, if an image size of an image file in an edit region is adjusted into ½, an image file set as an attachment file can be set to have a size amounting to ½ of an original copy file.

According to another embodiment of the present invention, in case that a type of a multimedia file inserted in an edit region is set as an attachment file is a $1^{st}$ file type, the controller 180 can control the type of the multimedia file to be manually or automatically changed into a $2^{nd}$ file type. This is described in detail with reference to FIG. 10 as follows.

Figure 10A:
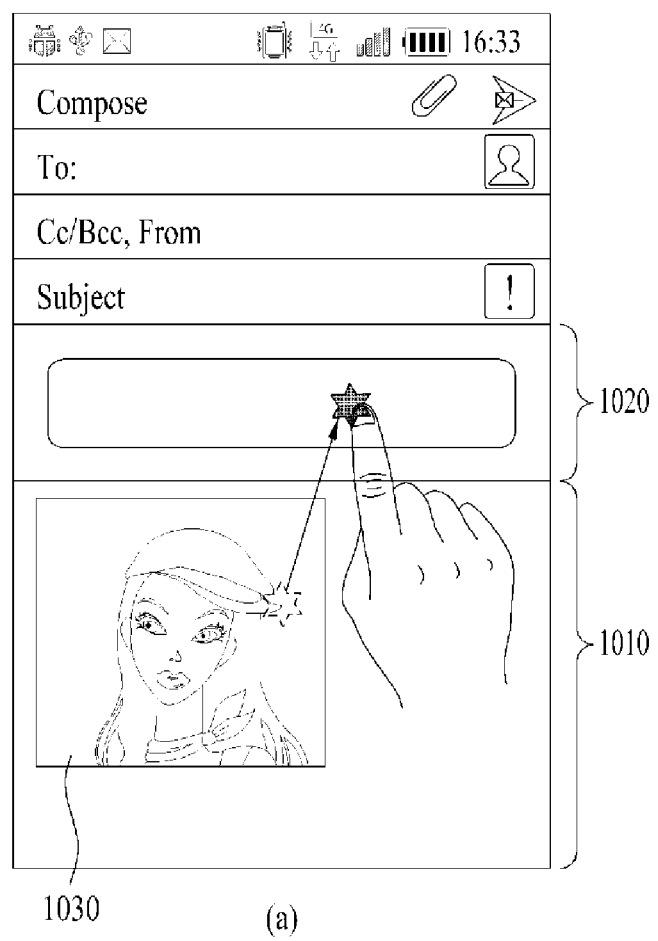
FIGS. 10a to 10c are a diagram for one example to describe a process for changing a 1$^{st}$ file type of a multimedia file into a 2$^{nd}$ file type.
Figure 10B:
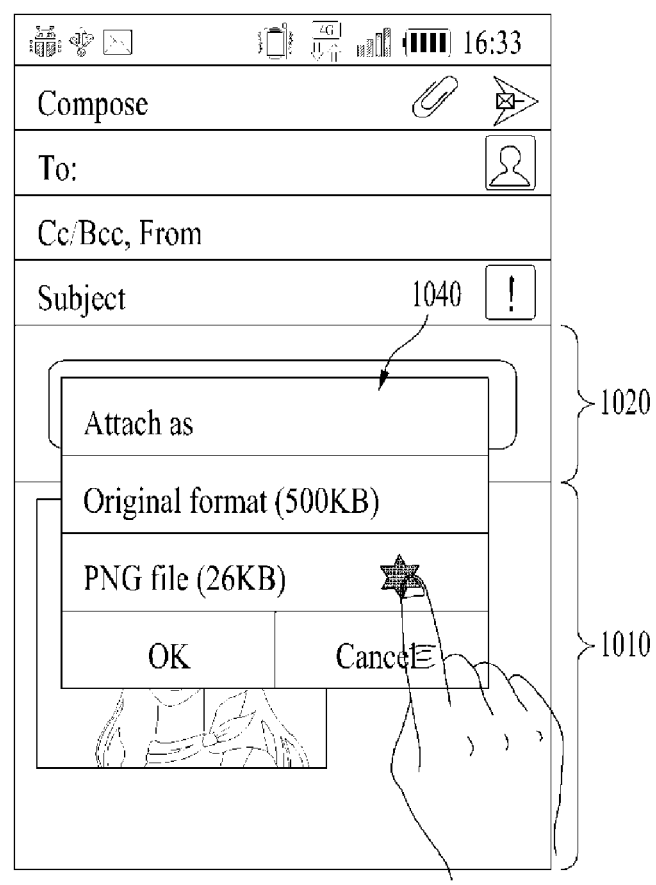
Figure 10C:
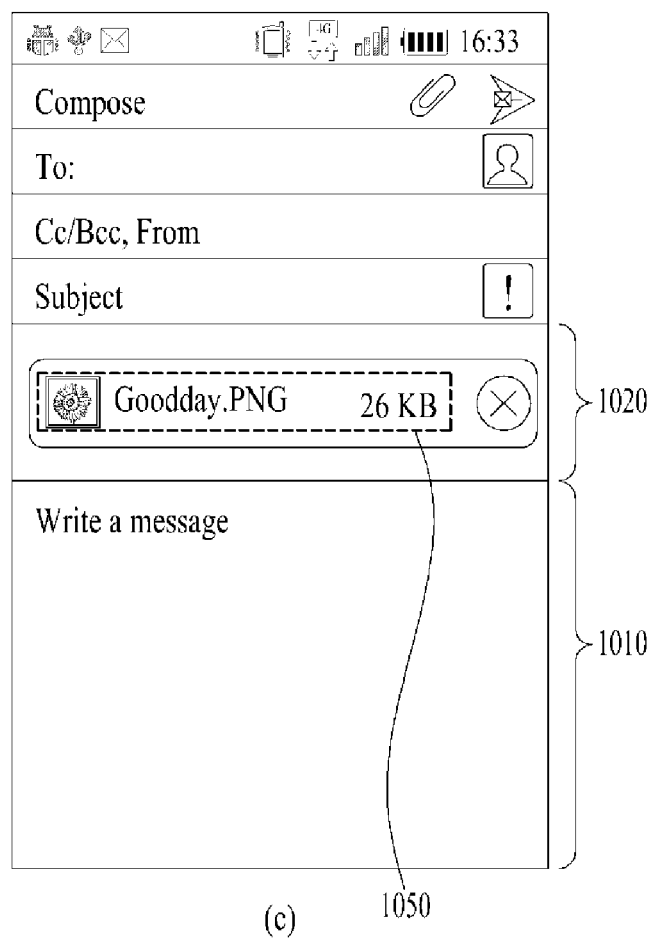
Figure 11A:
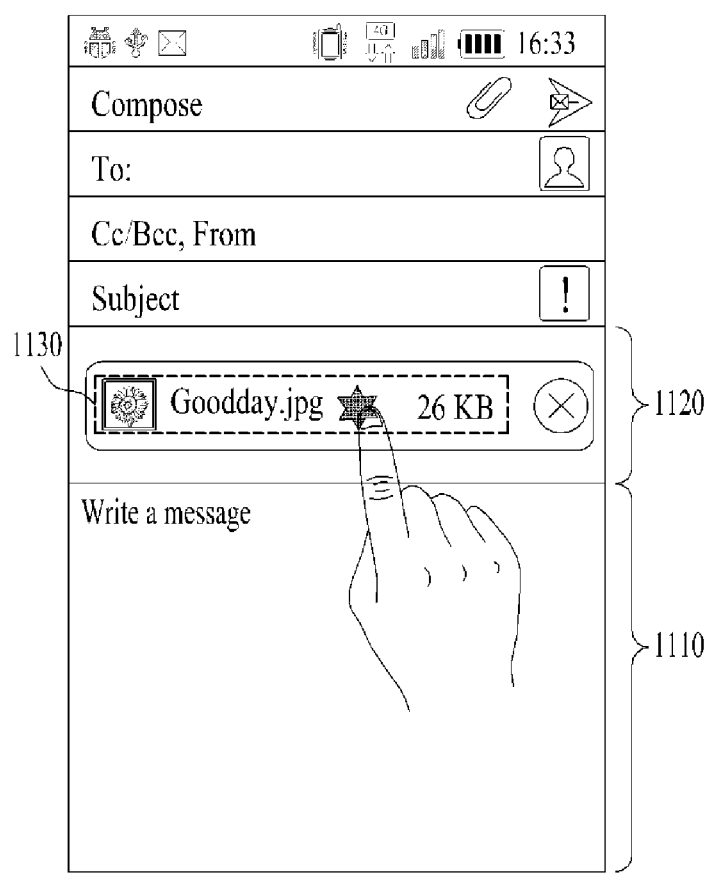
FIGS. 11a to 11d are a diagram for one example to describe a process for inserting a multimedia file set as an attachment file in an edit region.
Figure 11B:
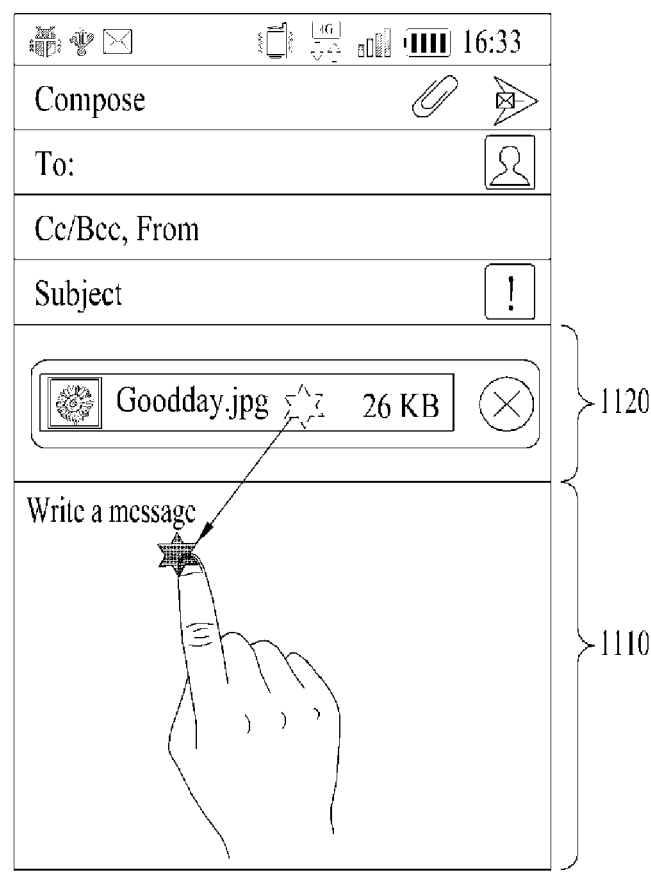
Figure 11C:
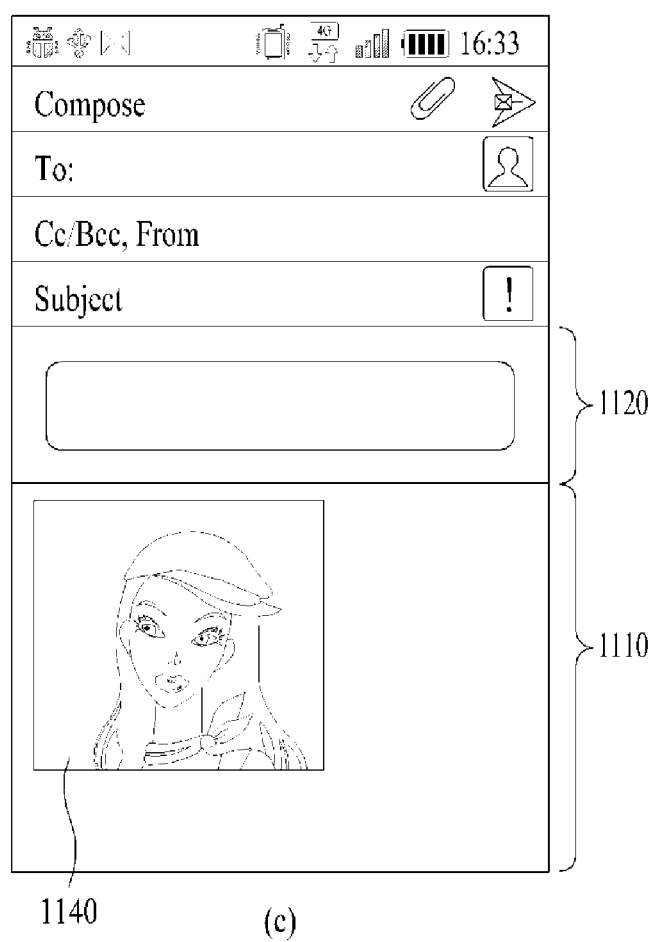
Figure 11D:
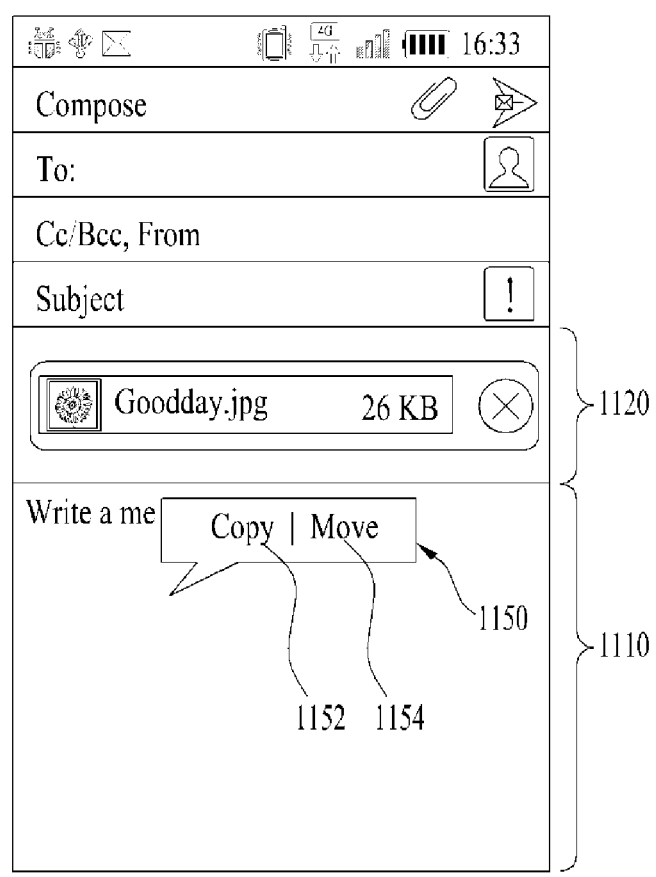

FIG. 10 is a diagram for one example to describe a process for changing a $1^{st}$ file type of a multimedia file into a $2^{nd}$ file type. For clarity of the following description, assume that a multimedia file described with reference to FIG. 10 includes an image file, that a $2^{nd}$ file type includes an image having an extension 'png', and that a $1^{st}$ file type includes an image having an extension other than that of the $2^{nd}$ file type.

Referring to FIG. 10 (a), if an image file 1030 displayed on an edit region 1010 is touched & dragged to an attach region 1020, the controller 180 can determine whether the image file 1030 corresponds to a $1^{st}$ file type or a $2^{nd}$ file type. As a result of the determination, if the image file is determined as corresponding to the $1^{st}$ file type or as not corresponding to the $2^{nd}$ file type, referring to FIG. 10 (b), the controller 180 can control a popup window 1040, which is provided to adjust an extension of an image file to be attached, to be displayed. In the example shown in FIG. 10 (b), if a region 'Original format' is touched, the controller 180 can set the image file of the $1^{st}$ file type as an attachment file. Otherwise, if a region 'PNG file' is touched in the example shown in FIG. 10 (b), the controller 180 changes the $1^{st}$ file type of the image file into the $2^{nd}$ file type and is then able to set the image file of the $2^{nd}$ file type as an attachment file. Referring to FIG. 10 (c), an information 1050 of the image file having its format changed into 'png' file format is displayed on the attach region 1020.

In displaying the popup window 1040 for guiding the $1^{st}$ file type of the image file to be changed into the $2^{nd}$ file type, the controller 180 can control the popup window 1040 to display a size of the image file saved as the $1^{st}$ file type and a size of the image file saved as the $2^{nd}$ file type. Through this, in case that the $1^{st}$ file type is changed into the $2^{nd}$ file type, a user is facilitated to determine how much size will be saved. For instance, referring to FIG. 10 (b), if the image file is saved in Original Format, a size of the image file is 500 Kbytes. If the image file is attached by being changed into a PNG file, a size of the image file is 26 Kbytes. Hence, a user can recognize that about 474 Kbytes can be saved.

In the example shown in FIG. 10, an image file of a $1^{st}$ file type is manually adjusted into an image file of a $2^{nd}$ file type in response to a user's touch input. Yet, such a process can be automatically performed by the controller 180. In doing so, if the image file is determined as the $1^{st}$ file type, the controller 180 can automatically change the image file into the $2^{nd}$ file type without displaying the popup window shown in FIG. 10 (b).

Preferably, the $2^{nd}$ file type has a compression ratio higher than that of the $1^{st}$ file type. This is to reduce a file size of a multimedia file set as an attachment file in a manner of changing the multimedia file of the $1^{st}$ file type set as an attachment file into the multimedia file of the $2^{nd}$ file type having a higher compression ratio. By means of reducing a size of the attachment file, a time taken to complete a message transmission can be decreased and a data transmission amount of the mobile terminal can be saved.

For instance, for an image file, assume a case that a $1^{st}$ file type is set as one format of JPG, GIF, TIFF, WMF and BMP and that a $2^{nd}$ file type is set as PNG format having a compression ratio higher than that of the $1^{st}$ file type. In this case, by changing the image file of the $1^{st}$ file type into the $2^{nd}$ file type, a file size of the image file set as an attachment file can be reduced. Hence, it is able to lower a transmission amount of a message transmission.

The above-mentioned extensions corresponding to the $1^{st}$ or $2^{nd}$ file type are enumerated for the clarity of the description only, by which the present invention may be non-limited. In some cases, the $1^{st}$ file type can be set to an extension other than the 1nd file type.

Moreover, it is not mandatory for the $2^{nd}$ file type to be always set to have a compression ratio higher than that of the $1^{st}$ file type. For instance, the settings of the $1^{st}$ and $2^{nd}$ file types may be adjusted by a user or a manufacturer of the mobile terminal.

Furthermore, the description with reference to FIG. 10 can be exactly applied to such a multimedia file as a music file, a document file, a video file and the like as well as to an image file.

Referring now to FIG. 4, when the multimedia file is set as the attachment file, if the information of the attachment file displayed on the attach region is touched and dragged to the edit region, the controller 180 can control the multimedia file to be inserted in the edit region [S405]. In doing so, although the multimedia file previously set as the attachment file may lose its status of the attachment file, it may maintain the status of the attachment file after being inserted in the edit region. Yet, in order to prevent a redundant transmission of the same data, the multimedia file inserted in the edit region may preferably lose its status of the attachment file.

In the following description, a process for inserting a multimedia file set as an attachment file in an edit region is explained in detail with reference to FIG. 11.

FIG. 11 is a diagram for one example to describe a process for inserting a multimedia file set as an attachment file in an edit region. For clarity of the following description, assume that a multimedia file set as an attachment file includes an image file.

Referring to FIG. 11, the controller 180 can control an information of an image file set as an attachment file to be displayed on an attach region 1120 [FIG. 11 (a)]. In doing so, if the information 1130 of the image file displayed on the attach region 1120 is touched and then dragged to an edit region 1110 [FIG. 11 (b)], the controller 180 can control the image file 1140 to be displayed on the edit region 1110 [FIG. 11 (c)].

If the information 1130 of the image file displayed on the attach region 1120 is touched and then dragged, while the drag action is performed, i.e., while a pointer comes in contact with the touchscreen, the controller 180 can control a thumbnail of the image file to be displayed along the pointer. This is to facilitate a user to check a content of the image file attempted to be inserted in the edit region 1110 by the user.

In case that the image file previously set as the attachment file is inserted in the edit region 1110, the image file set as the attachment file may maintain or lose its status of the attachment file. According to one example of the present invention, referring to FIG. 11 (d), before the image file is inserted in the edit region 1110, the controller 180 can control a popup window 1150, which is provided to determine whether an attachment file status of the image file will be maintained, to be displayed. In the popup window 1150 shown in FIG. 11 (d), if a 'copy' region 1152 is touched, the controller 180 can control the image file to be inserted in the edit region 1110 while having the attachment file status of the image file maintained. On the other hand, if a 'move' region 1154 of the popup window 1150 is touched, the controller 180 can control the image file to be inserted in the edit region 1110 while controlling the attachment file status of the image file to be lost.

Although FIG. 11 shows one example that the multimedia file includes the image file, the description with reference to FIG. 11 can be exactly applied to such a multimedia file as a music file, a document file, a video file and the like as well as to an image file. In particular, if an information of a music/document/video file displayed on the attach region 1120 is touched and then dragged to the attach region 1120, the controller 180 can control the music/document/video file to be inserted in the edit region 1110.

In case that an image file set as an attachment file is inserted in an edit region, the controller 180 can adjust a resolution or image size of the image file automatically or on the basis of a user input. In particular, as the resolution or image size of the image file is equal to or greater than a preset threshold, if it is determined that the image file needs not to be displayed in an original size, the controller 180 can display the resolution or image size adjusted image file on the edit region. This is described in detail with reference to FIG. 12 as follows.

Figure 12A:
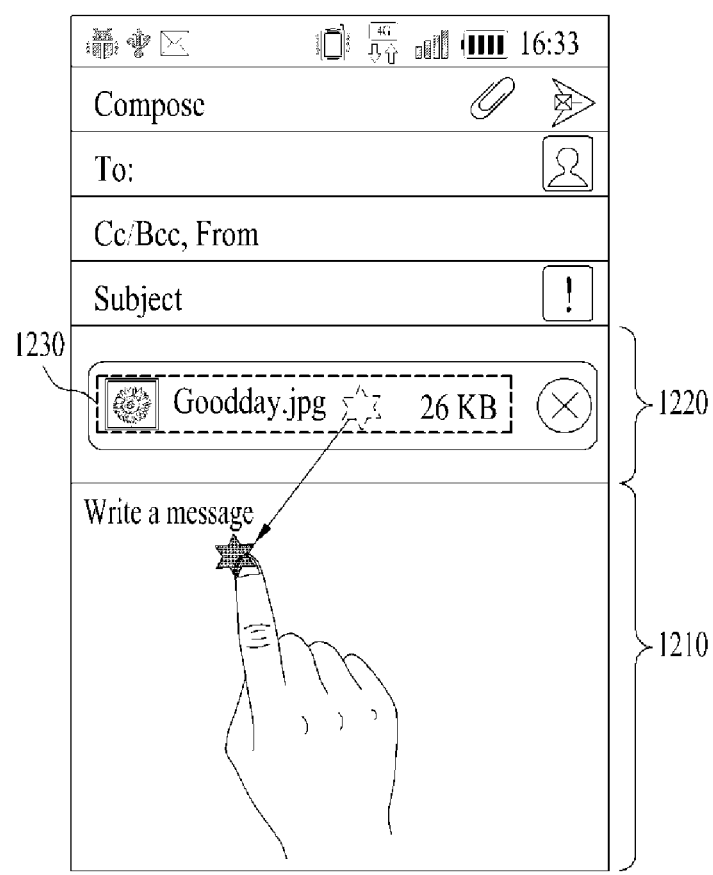
FIGS. 12a and 12b are a diagram for one example to describe a process for displaying a resolution or image-size adjusted image file on an edit region.
Figure 12B:
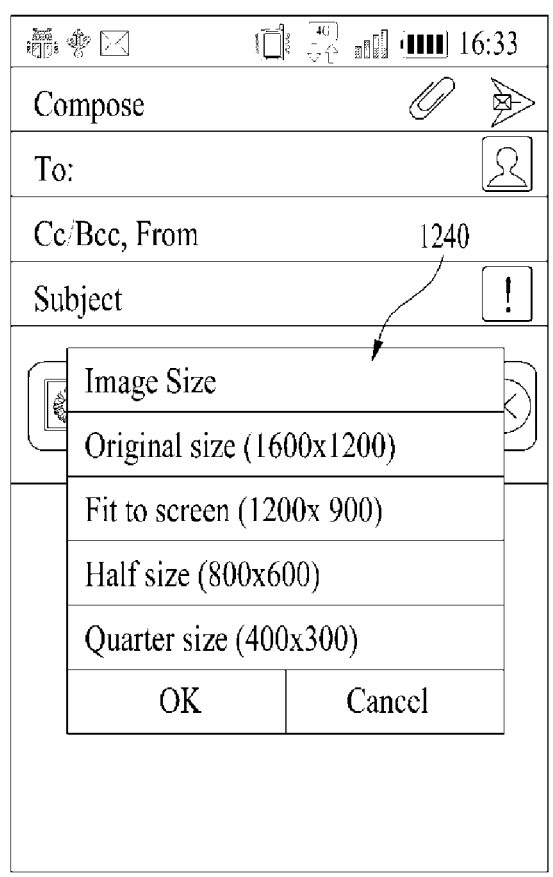
Figure 13A:
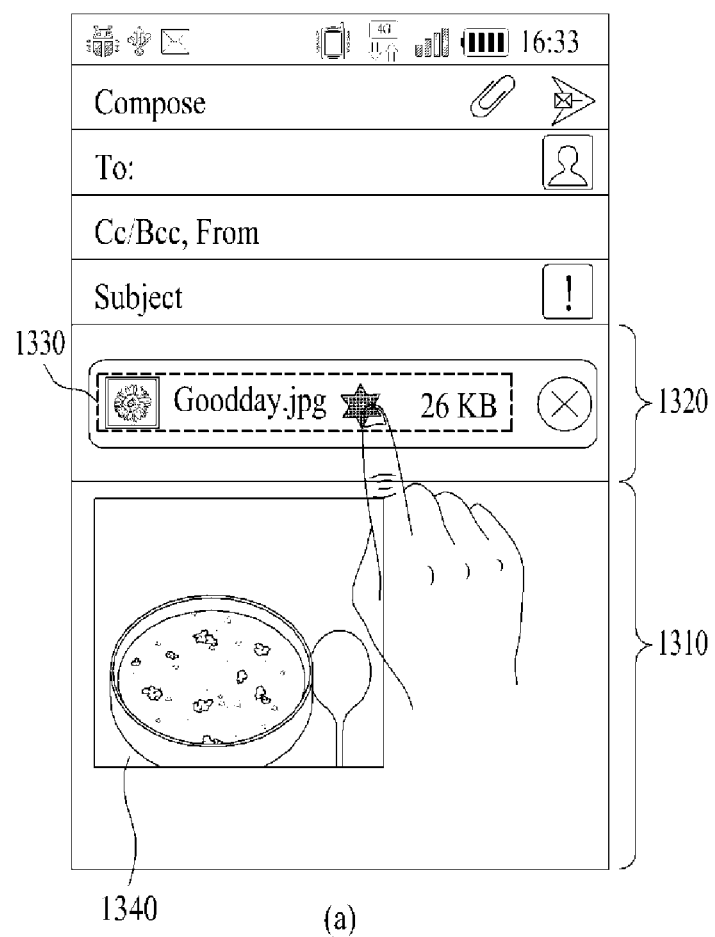
FIGS. 13a to 13f and FIGS. 14a to 14e are diagrams for examples to describe a process for combining a 1$^{st}$ multimedia file and a 2$^{nd}$ multimedia file together.
Figure 13B:
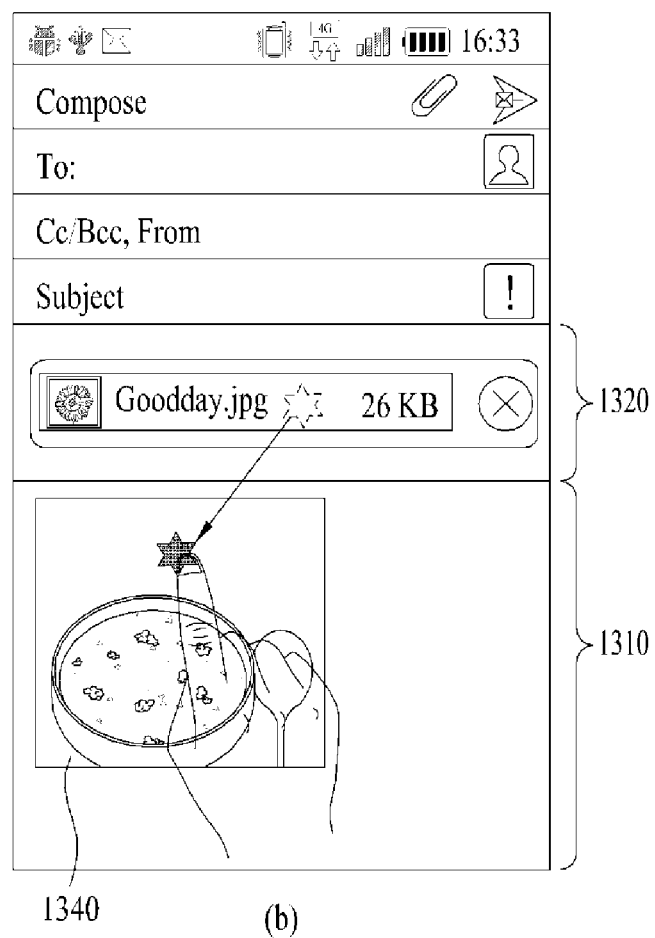
Figure 13C:
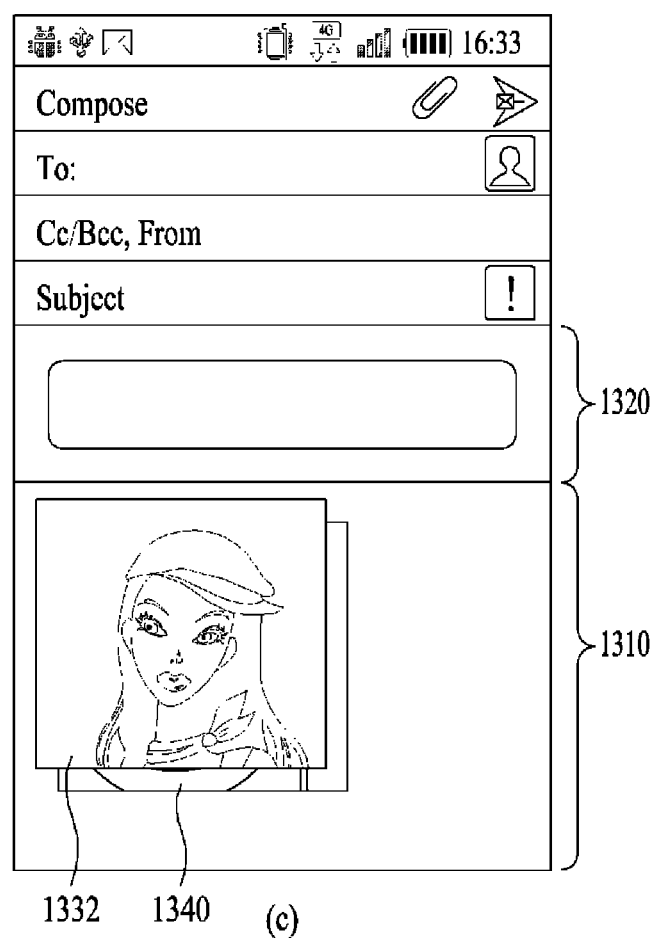
Figure 13D:
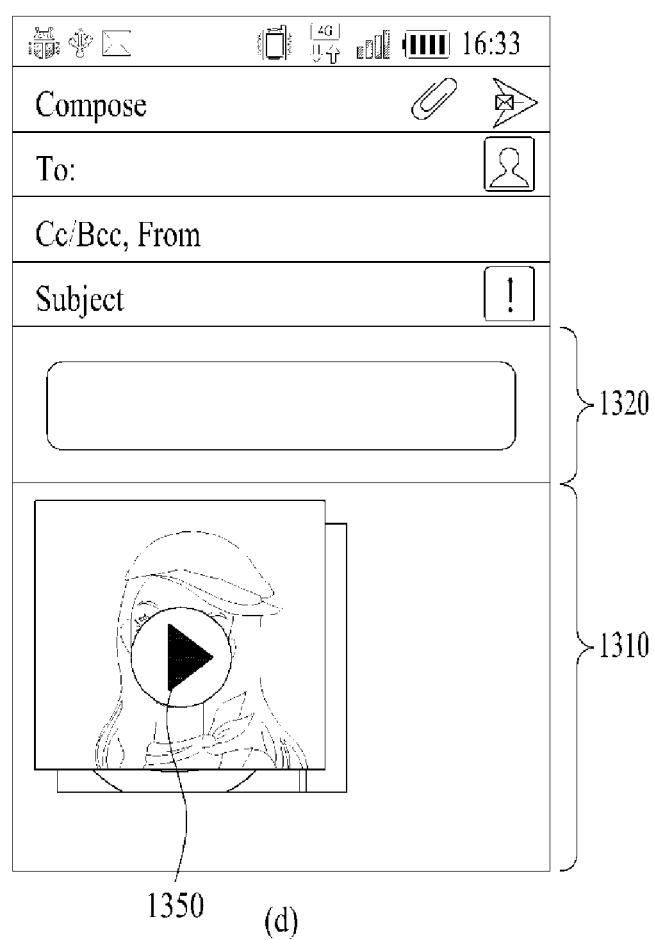
Figure 13E:
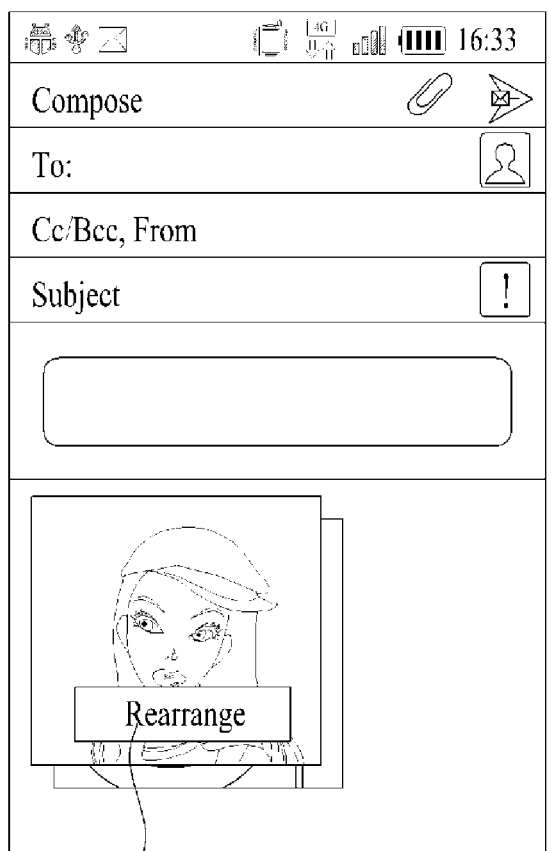
Figure 13F:
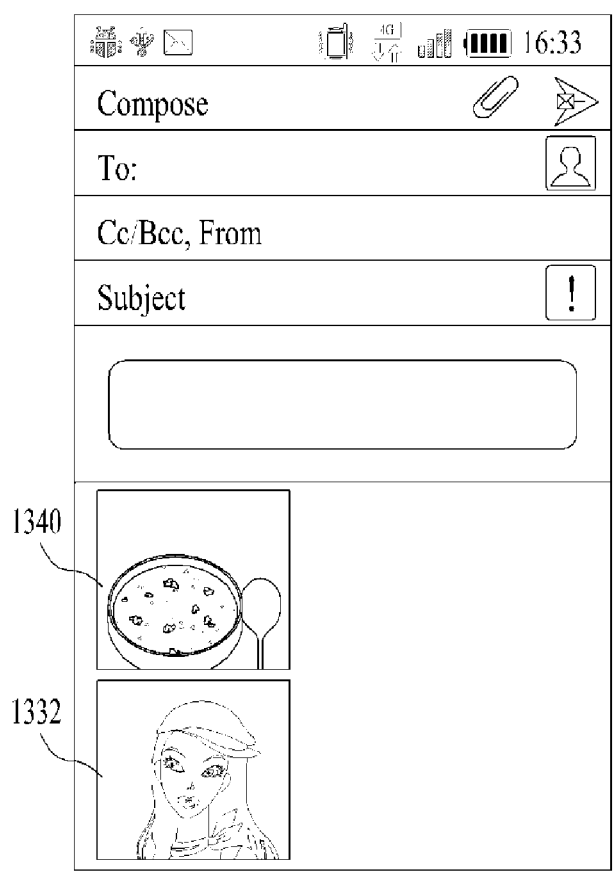
Figure 14A:
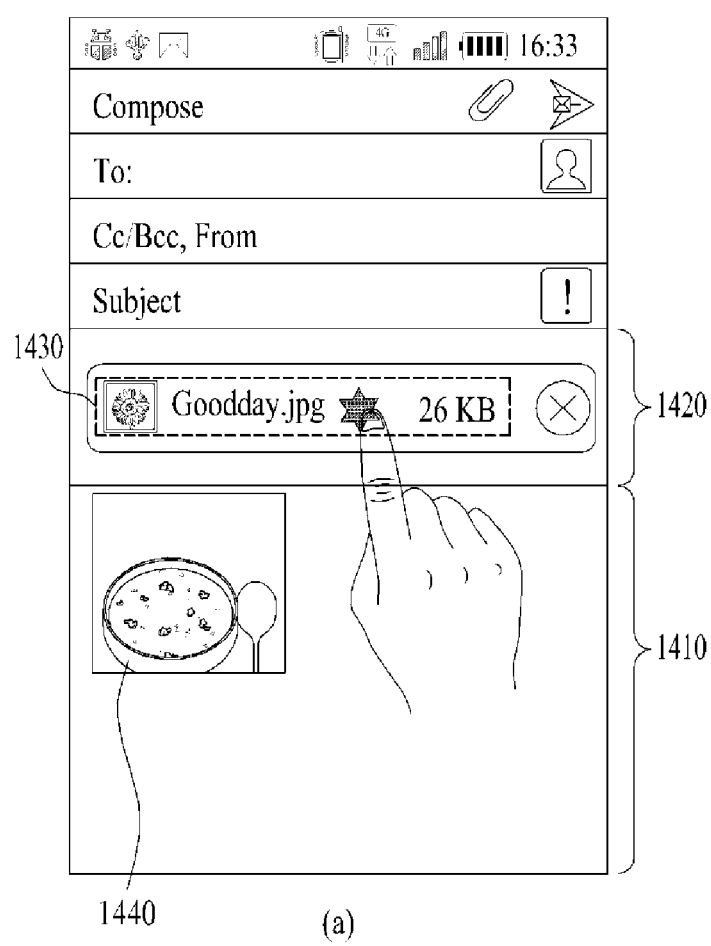
Figure 14B:
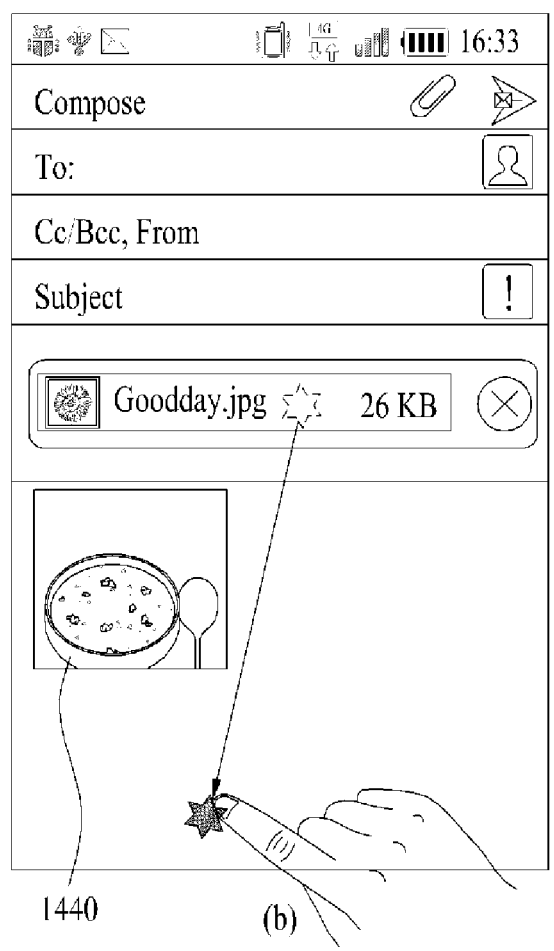
Figure 14C:
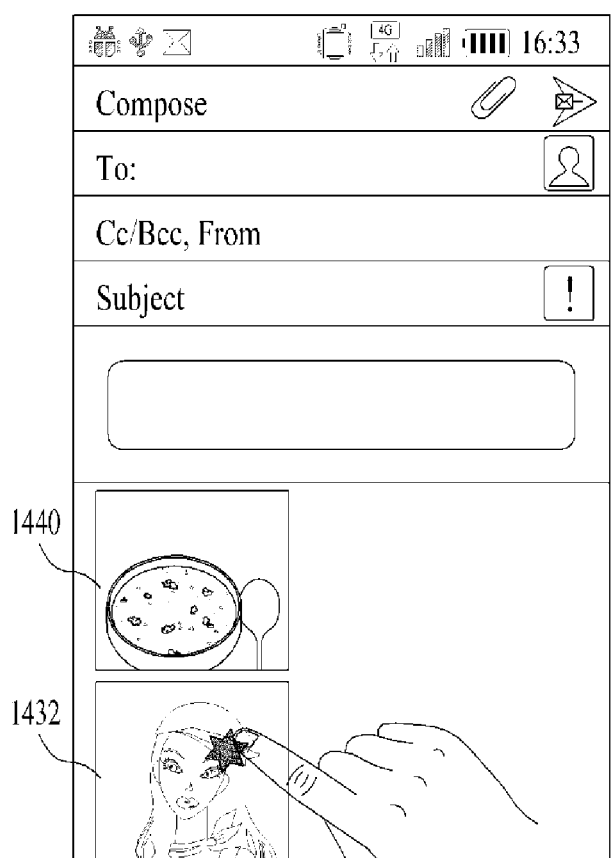
Figure 14D:
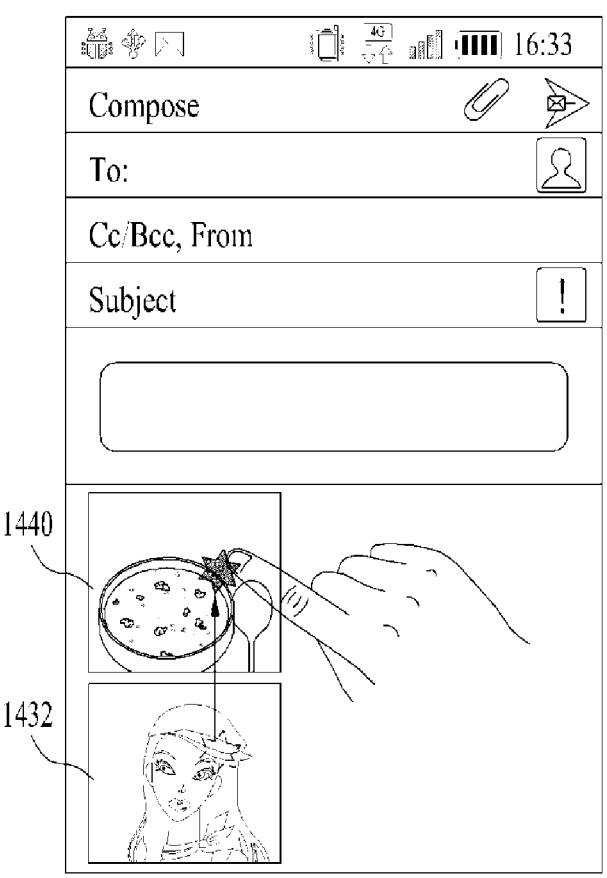
Figure 14E:
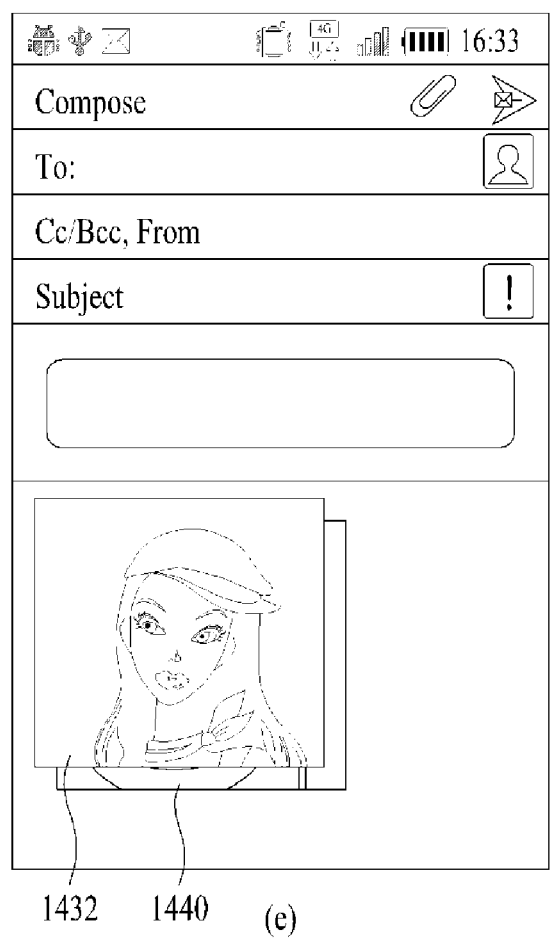
Figure 15A:
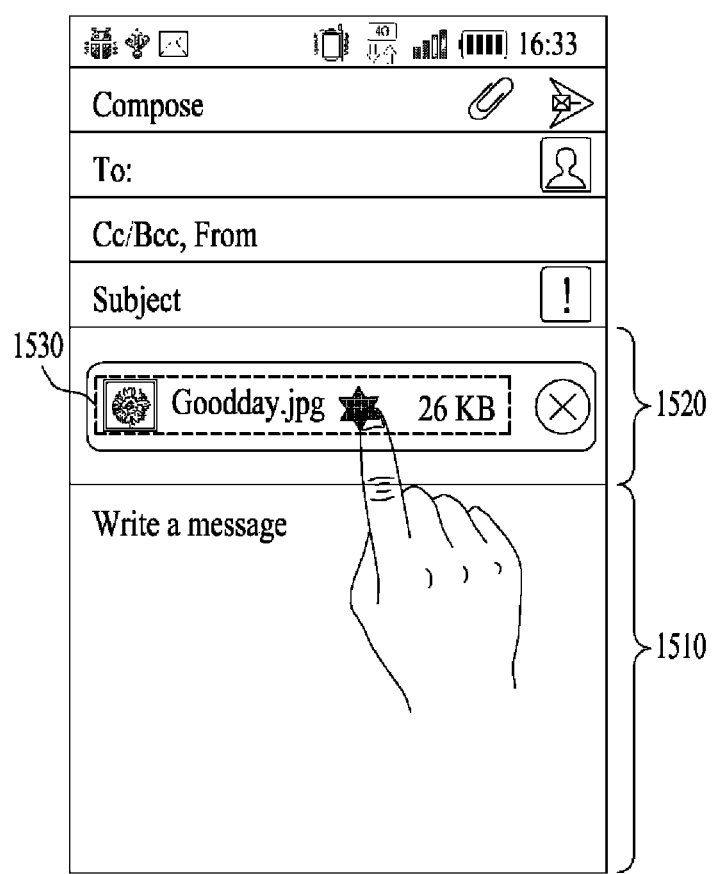
FIGS. 15a to 15d are a diagram for one example to describe a process for inserting a multimedia file set as an attachment file in an edit region using a copy or cutting.
Figure 15B:
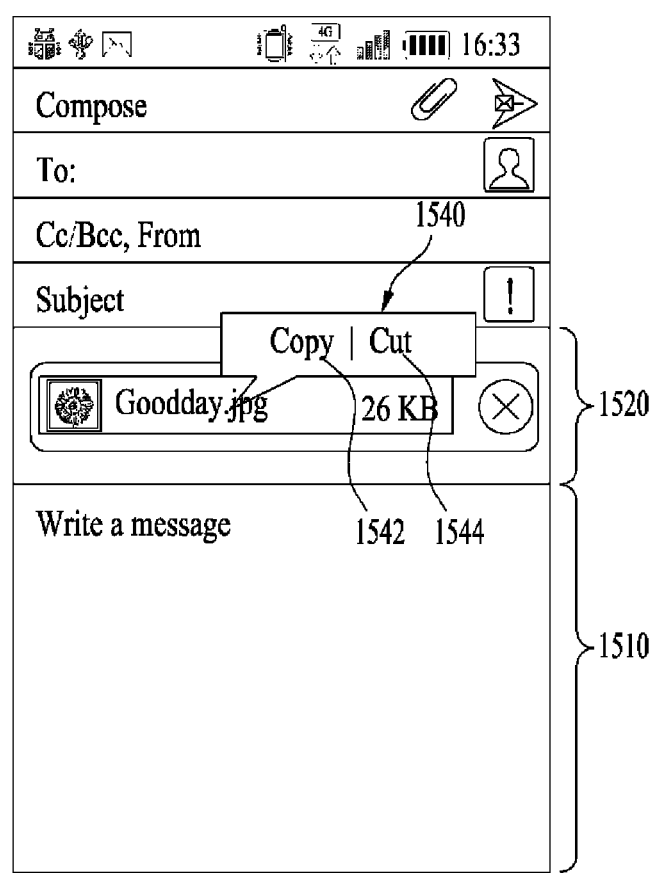
Figure 15C:
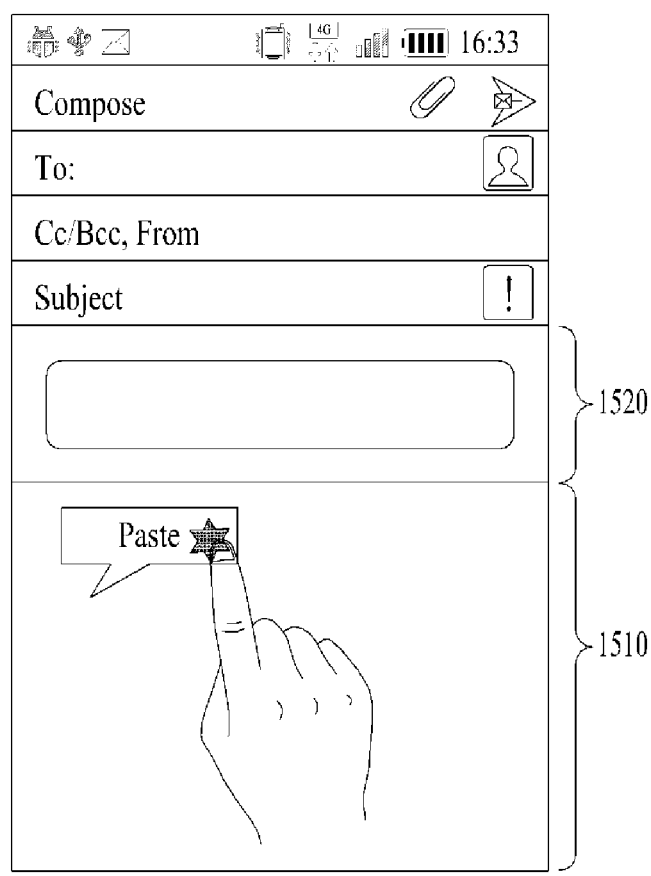
Figure 15D:
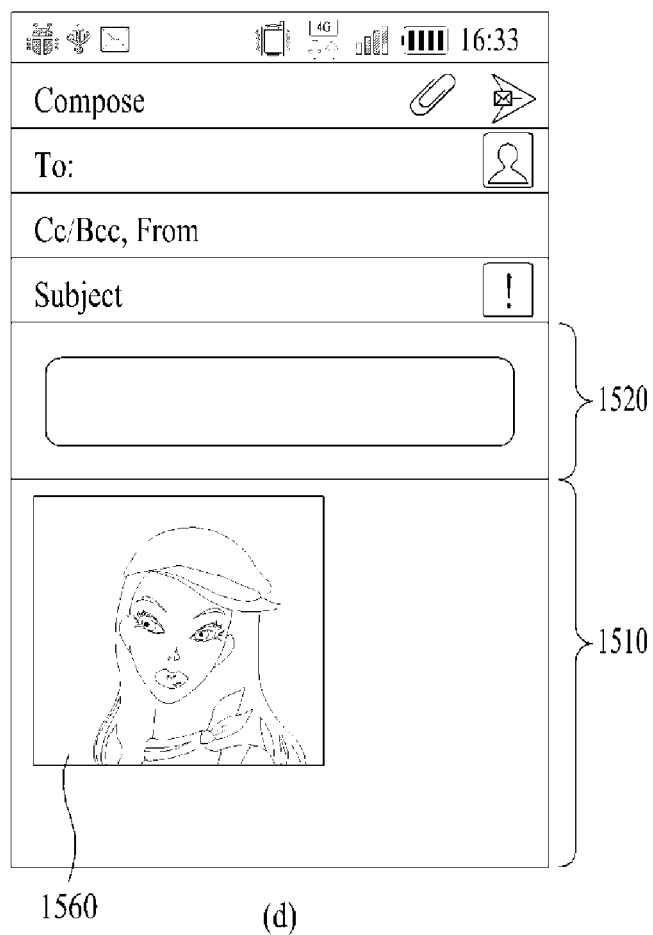
Figure 16A:
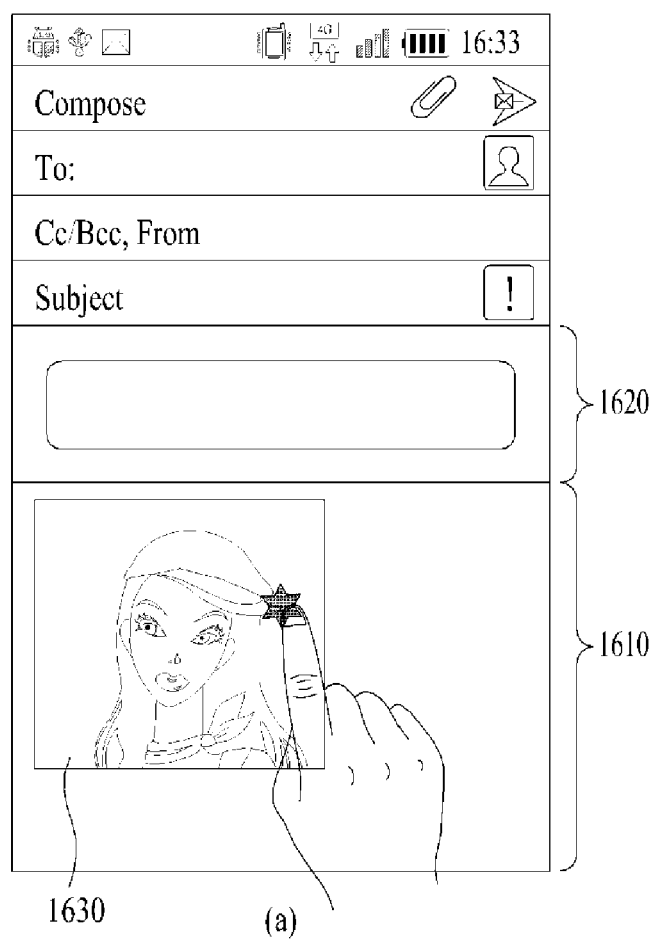
FIGS. 16a to 16d are a diagram for one example to describe a process for setting a multimedia file inserted in an edit region using a copy or cutting as an attachment file.
Figure 16B:
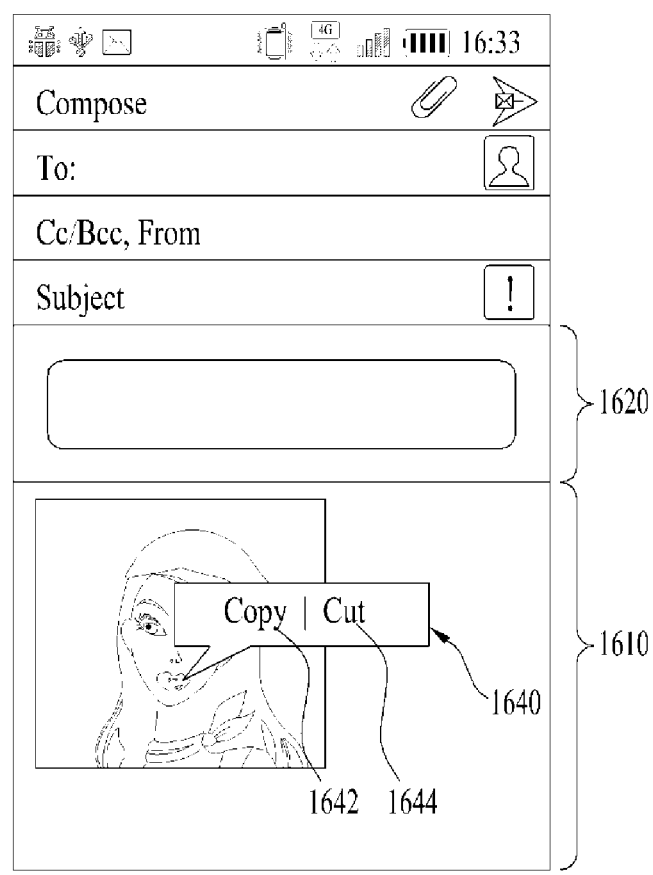
Figure 16C:
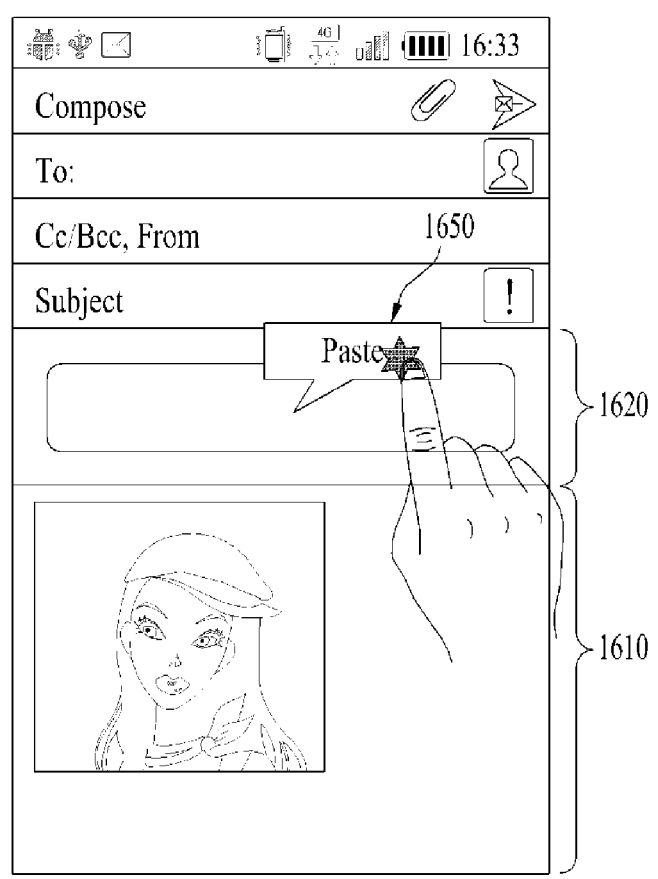
Figure 16D:
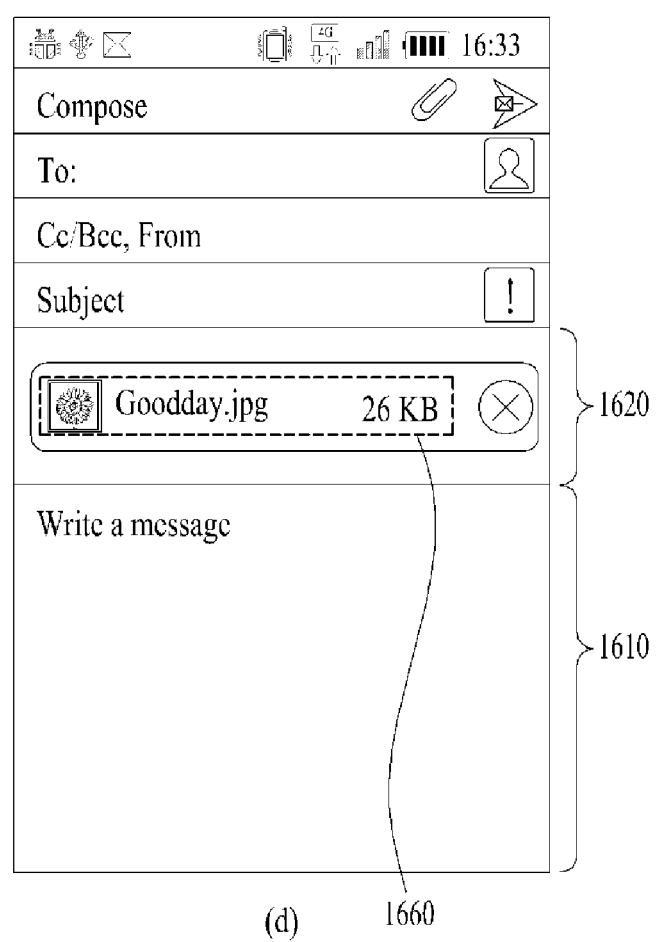

FIG. 12 is a diagram for one example to describe a process for displaying a resolution or image-size adjusted image file on an edit region.

Referring to FIG. 12 (a), if an information 1230 of an image file displayed on an attach region 1220 is touched and dragged to an edit region 1210, the controller 180 can determine a resolution or image size of the image file which is to be inserted in an image region. In doing so, if the resolution or the image size of the image file is equal to or greater than a preset threshold, the controller 180 can control a popup window 1240, which is provided to adjust the resolution or image size of the image file, to be displayed. For instance, FIG. 12 (b) shows one example that the popup window 1240 for adjusting the image size of the image file is displayed. In the popup window 1240 shown in FIG. 12 9b), if 'Original size' is touched, the controller 180 can control the image file in an original size to be exactly displayed on the edit region 1210 without adjusting the image size of the image file. On the other hand, if 'Fit to screen', 'Half size' or 'Quarter size' is selected, the controller 180 adjusts the image size of the image file and is then able to control the image size adjusted image file to be inserted in the edit region 1210. In this case, 'Fit to screen' may be provided to adjust the image size to fit for a length of one side of the touchscreen, 'Half size' may be provided to adjust the image size into ½ of an original image size, and 'Quarter size' may be provided to adjust the image size into ¼ of the original image size. If an item to be adjusted is the resolution, the controller 180 may control a popup window, which is provided to adjust the resolution of the image file, to be displayed instead of displaying the former popup window 1240 shown in FIG. 12 (b).

In the example shown in FIG. 12, a resolution or image size of an image file is manually adjusted in response to a user's touch input. Moreover, the above-described process can be automatically performed by the controller 180. In this case, if the resolution or image size of the image file is equal to or greater than a preset threshold, the controller 180 can automatically adjust the resolution or image size of the image file by omitting the popup window displaying step shown in FIG. 12 (b). For instance, if a length of a horizontal side of the image file is greater than a width of the touchscreen or a length of a vertical side is greater than a height of the touchscreen, since the image file exceeds a maximum size that can be outputted by the touchscreen, the controller 180 can adjust the image size of the image file into a range within the maximum size that can be outputted by the touchscreen. This is to enable a user to check a content of the image file without scrolling the touchscreen.

When one multimedia file set as an attachment file is intended to be inserted in an edit region, if another multimedia file is already inserted in the edit region, the controller 180 can combine the multimedia file previously inserted in the edit region and the multimedia file to be newly inserted in the edit region together. In this case, if two multimedia files are combined together, it may mean an operation of merging the two multimedia files into a single file or an operation of setting the two multimedia files to a single playlist to enable the two multimedia files to be consecutively played.

In particular, if an information of one multimedia file displayed on an attachment file region is dragged to a region on which another multimedia file already inserted in an edit region is displayed, the controller 180 can combine the multimedia file previously inserted in the edit region and the mobile media file to be newly inserted in the edit region together. On the other hand, if the information of the multimedia file displayed on the attachment file region is dragged to an outside of the region on which the multimedia file already inserted in the edit region is displayed, the controller 180 can control the multimedia file previously inserted in the edit region and the multimedia file newly inserted in the edit region to be separately or individually displayed.

In particular, the controller 180 can determine how to combine the multimedia files in a manner of discriminating one case of dragging the information of one multimedia file displayed on the attachment file region to a region on which another multimedia file already inserted in an edit region from the other case of dragging information of the multimedia file displayed on the attachment file region to an outside of the region on which the multimedia file already inserted in the edit region is displayed. This shall be described in detail with reference to FIG. 13 and FIG. 14 as follows. First of all, for clarity of the following description, one multimedia file, which used to set as an attachment file and will be inserted in an edit region, shall be named a $1^{st}$ multimedia file. Another multimedia file, which has been already inserted in the edit region before the $1^{st}$ multimedia file is inserted in the edit region, shall be named a $2^{nd}$ multimedia file. And, assume that each of the $1^{st}$ multimedia file and the $2^{nd}$ multimedia file includes an image file in FIG. 13 and FIG. 14.

FIG. 13 and FIG. 14 are diagrams for examples to describe a process for combining a $1^{st}$ multimedia file and a $2^{nd}$ multimedia file together.

Referring to FIG. 13 (a) and FIG. 14 (a), if a $1^{st}$ image file is set as an attachment file and a $2^{nd}$ image file is inserted in an edit region 1310/1410, the controller 180 can control an information 1330/1430 of the $1^{st}$ image file to be displayed on an attach region 1320/1420 and can control the $2^{nd}$ image file to be displayed on a region 1340/1440 of the edit region 1301/1410.

In doing so, referring to FIG. 13 (b), if the information 1330 of the $1^{st}$ image file displayed on the attach region 1320 is touched and dragged to an inside of the region 1340 on which the $2^{nd}$ image file is displayed, the controller 180 can control the $1^{st}$ image file and the $2^{nd}$ image file to be combined together. In particular, the controller 180 controls the $1^{st}$ image file and the $2^{nd}$ image file to merge into a single image file. Alternatively, the controller 180 sets the $1^{st}$ image file and the $2^{nd}$ image file to a single playlist and is then able to control the $1^{st}$ image file and the $2^{nd}$ image file to be played as a slide show.

In case of combining the $1^{st}$ image file and the $2^{nd}$ image file together, in order to indicate that the $1^{st}$ image file and the $2^{nd}$ image file are combined together, referring to FIG. 13 (c), the controller 180 can control the $1^{st}$ image file and the $2^{nd}$ image file to be displayed on the edit region 1310 in a manner of overlay 1332 and 1340. If the $1^{st}$ image file and the $2^{nd}$ image file are displayed in a manner of overlaying each other, a user can recognize that the two images files are combined together.

In case of merging the $1^{st}$ image file and the $2^{nd}$ image file into a single image file, the merged image file may have a moving image file format. On the other hand, in case of setting the $1^{st}$ image file and the $2^{nd}$ image file to a single playlist, referring to FIG. 13 (d), the controller 180 can control a play button 1350 to be displayed on the edit region 1410. If the play button 1350 is touched, the controller 180 can control the $1^{st}$ image file and the $2^{nd}$ image file to be played as a slide show.

While the $1^{st}$ image file and the $2^{nd}$ image file are combined together, if an appropriate user input is received, the controller 180 can demerge the combined $1^{st}$ and $2^{nd}$ image files into two files again or release the $1^{st}$ image file and the $2^{nd}$ image file from the single playlist setting.

For instance, if a rearrange button 1360 shown in FIG. 13 (e) is touched, referring to FIG. 13 (f), the controller 180 can control the $1^{st}$ image file and the $2^{nd}$ image file to be individually displayed by being separated from each other [1332, 1340].

In the example shown in FIG. 13, each of the $1^{st}$ multimedia file and the $2^{nd}$ multimedia file includes an image file. Moreover, the process for combining two multimedia files together can be applied to such a multimedia file as a music file, a video file, a document file and the like. For instance, in case that each of the $1^{st}$ multimedia file and the $2^{nd}$ multimedia file includes a music file or a video file, the controller 180 can merge the $1^{st}$ multimedia file and the $2^{nd}$ multimedia file into a single file or can control the $1^{st}$ multimedia file and the $2^{nd}$ multimedia file to be automatically played in a manner that the $2^{nd}$ multimedia file is played after completion of a playback of the $1^{st}$ multimedia file, and vice versa. For another instance, if each of the $1^{st}$ multimedia file and the $2^{nd}$ multimedia file includes a document file, the controller 180 merges a $1^{st}$ document file and a $2^{nd}$ document file into a single file or can merge the $1^{st}$ document file and the $2^{nd}$ document file together in a manner of displaying a $1^{st}$ page of the $2^{nd}$ document file after displaying a last page of the $1^{st}$ document file or displaying a $1^{st}$ page of the $1^{st}$ document file after displaying a last page of the $2^{nd}$ document file.

Moreover, it may be unnecessary for the $1^{st}$ multimedia file and the $2^{nd}$ multimedia file, which are to be combined together, to belong to the same species. For instance, when the $1^{st}$ multimedia file and the $2^{nd}$ multimedia file include an image file and a music file, respectively, the controller 180 can control the $1^{st}$ multimedia file to be outputted in the course of playing back the $2^{nd}$ multimedia file in a manner of combining the $1^{st}$ multimedia file and the $2^{nd}$ multimedia file together.

Unlike the example shown in FIG. 13, if the information 1430 of the $1^{st}$ image file displayed on the attach region 1420 is touched and dragged to an outside of the region 1440 on which the $2^{nd}$ image file is displayed [FIG. 14 (b)], the controller 180 can control the $1^{st}$ image file and the $2^{nd}$ image file to be separately displayed on the edit region (1432, 1440) [FIG. 14 (c)]. Hence, the controller 180 can determine how to combine the $1^{st}$ multimedia file and the $2^{nd}$ multimedia file together based on whether the information 1430 of the $1^{st}$ image file previously displayed on the attach region is touched and dragged to the inside or outside of the display region 1440 of the $2^{nd}$ image file.

Even if the $1^{st}$ image file and the $2^{nd}$ image file are separately displayed on the edit region, the two image files can be combined together by a user input later. For instance, if the $1^{st}$ image file is dragged to the inside of the display region 1440 of the $2^{nd}$ image file or the $2^{nd}$ image file is dragged to an inside of the display region 1432 of the $1^{st}$ image file [FIG. 14 (d)], the controller 180 can combine the $1^{st}$ image file and the $2^{nd}$ image file together [FIG. 14 (e)]. In particular, even if the $1^{st}$ image file and the $2^{nd}$ image file are separately displayed, the controller 180 can combine the $1^{st}$ image file and the $2^{nd}$ image file together in response to a user input later. How to separate the combined $1^{st}$ and $2^{nd}$ image files from each other can refer to the former description with reference to FIG. 13 (e) and FIG. 13 (f), and its details shall be omitted from the following description.

Like the case shown in FIG. 13, the case shown in FIG. 14 can be applied to such a multimedia file as a music file, a video file, a document file and the like as well as to an image file.

In the example shown in FIG. 4, in case of dragging an information of a multimedia file displayed on an attach region to an edit region or dragging a multimedia file displayed on the edit region to the attach region, the multimedia file set as an attachment file is inserted in the edit region or a multimedia file inserted in the edit region is set as an attachment file. Unlike the example shown in FIG. 4, the controller 180 can insert a multimedia file set as an attachment file in an edit region using a copy or cut function or can set a multimedia file set in the edit region as an attachment file. This is described in detail with reference to FIG. 15 and FIG. 16 as follows.

FIG. 15 is a diagram for one example to describe a process for inserting a multimedia file set as an attachment file in an edit region using a copy or cutting. For clarity of the following description, assume that a multimedia file includes an image file.

Referring to FIG. 15, if an image file is set as an attachment file, the controller 180 can display an information 1530 of the image file on an attach region 1520 [FIG. 15 (a)]. In doing so, in order to select the image file displayed on the attach region 1520, if an appropriate touch input is applied to the information 1530 of the image file, the controller 180 can control a popup window 1540, which is provided to determine whether to copy or cut the selected image file, to be displayed [FIG. 15 (b)]. For instance, in the popup window 1540 shown in FIG. 15 (b), a 'Copy' item 1542 may be provided to copy a selected image file and a 'Cut' item 1544 may be provided to cut a selected image file.

After the selected image file has been copied or cut in the example shown in FIG. 15 (b), if an appropriate touch input is applied to the edit region 1510, the controller 180 can control a popup window 1550, which is provided to paste the copied or cut image file, to be displayed [FIG. 15 (c)]. If the copied or cut image file is pasted, the controller 180 can control the image file 1560 to be displayed on the edit region 1510 [FIG. 15 (d)].

If 'Copy' is selected in FIG. 15 (b), the controller 180 inserts the image file in the edit region 1510 and can also control the image file to maintain its status of the attachment file as it is. On the other hand, if 'Cut' is selected in FIG. 15 (b), the controller 180 inserts the image file in the edit region 1510 and can also control the image file to be released from the status of the attachment file.

FIG. 16 is a diagram for one example to describe a process for setting a multimedia file inserted in an edit region using a copy or cutting as an attachment file. For clarity of the following description, like the case shown in FIG. 15, assume that a multimedia file includes an image file.

Referring to FIG. 16, if an image file is inserted in an edit region 1610, the controller 180 can control the image file 1630 to be displayed on the edit region 1610 [FIG. 16 (*a*)]. In doing so, in order to select the image file displayed on the edit region 1610, if an appropriate touch input is applied to the image file displayed on the edit region 1610, the controller 180 can control a popup window 1640, which is provided to determine whether to copy or cut the selected image file, to be displayed [FIG. 16 (*b*)]. For instance, in the popup window 1640 shown in FIG. 16 (*b*), a 'Copy' item 1642 may be provided to copy a selected image file and a 'Cut' item 1644 may be provided to cut a selected image item. After the selected image file has been copied or cut in the example shown in FIG. 16 (*b*), if an appropriate touch input is applied to the attach region 1620, the controller 180 can control a popup window 1650, which is provided to paste the copied or cut image file, to be displayed [FIG. 16 (*c*)]. If the copied or cut image file is pasted on the attach region 1620, the controller 180 sets the image file as an attachment file and can also control an information 1660 of the image file, which is set as the attachment file, to be displayed on the attach region 1620 [FIG. 16 (*d*)].

In the example shown in FIG. 16 (*b*), if 'Copy' is selected, the controller 180 sets the image file as an attachment file and can also control the image file to be displayed on the edit region 1610 as it is. On the other hand, if 'Cut' is selected in FIG. 16 (*b*), the controller 180 sets the image file as an attachment file and can also delete the image file displayed on the edit region 1610.

In the above-described example, an operation of a mobile terminal attempting to send a message to a counterpart is explained. In the following description, an operation of a mobile terminal having received a message from a counterpart is explained in detail.

Figure 17:
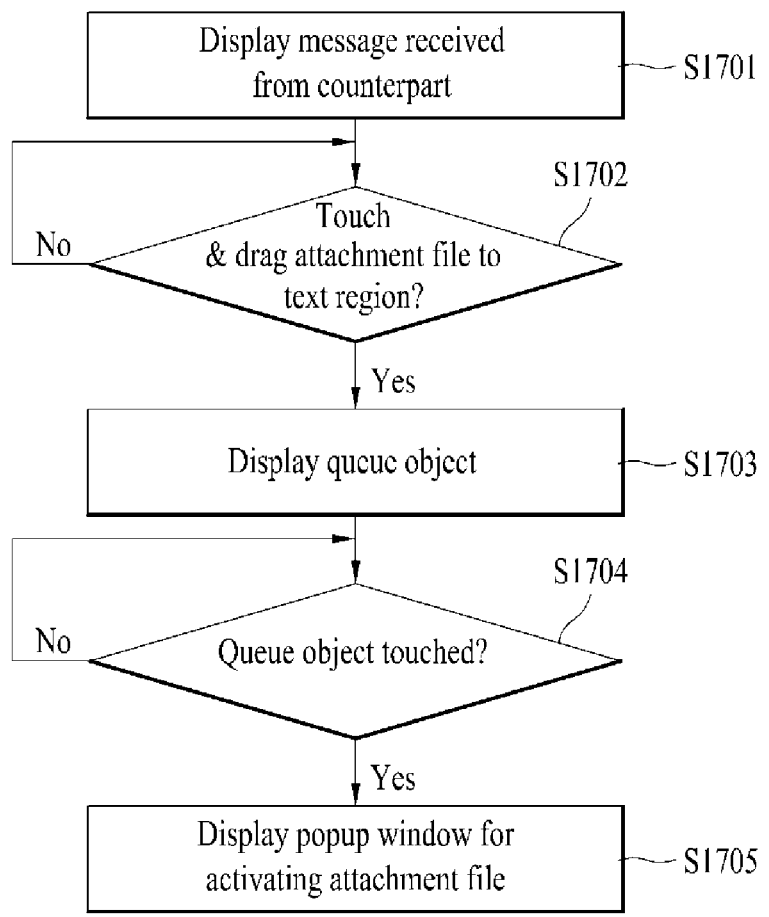
FIG. 17 is a flowchart for an operation of a mobile terminal according to the present invention.

FIG. 17 is a flowchart for an operation of a mobile terminal according to the present invention.

Referring to FIG. 17, in case of receiving a message from a counterpart via the wireless communication unit 110, the controller 180 can control the message received from the counterpart to be displayed on the touchscreen [S1701]. If an attachment file exists in the message received from the counterpart, the controller 180 can control the message received from the counterpart to be displayed in a manner of discriminating a text region for displaying a text content of the message received from the counterpart from an attach region for displaying the attachment file attached to the message received from the counterpart.

Figure 18:
FIG. 18 is a diagram for one example to describe a process for displaying a message received from a counterpart on a touchscreen.
Figure 19A:
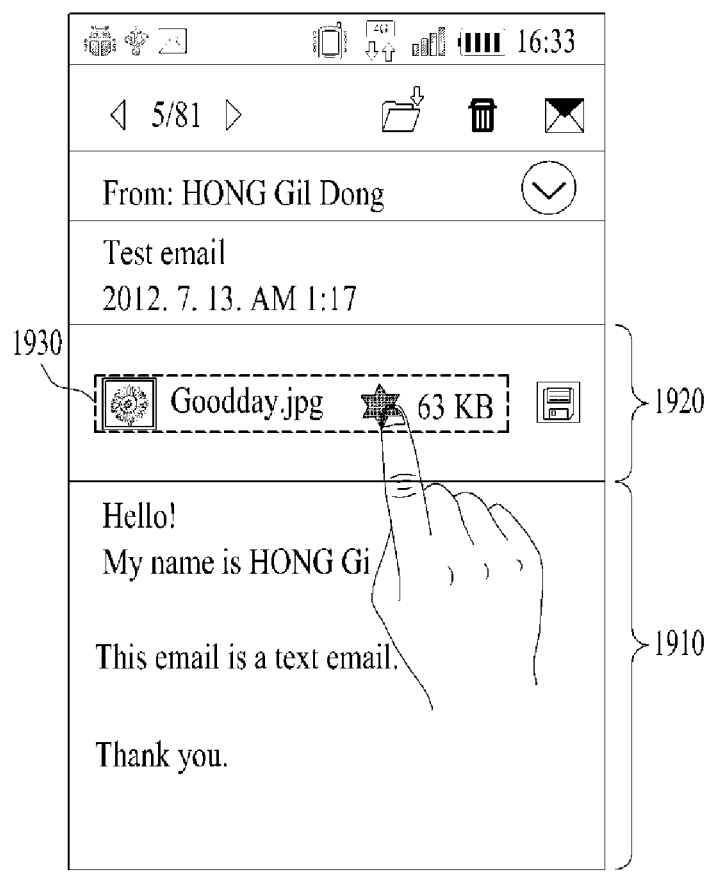
FIGS. 19a to 19d are a diagram for one example to describe a process for displaying a queue object to activate an attachment file on a touchscreen.
Figure 19B:
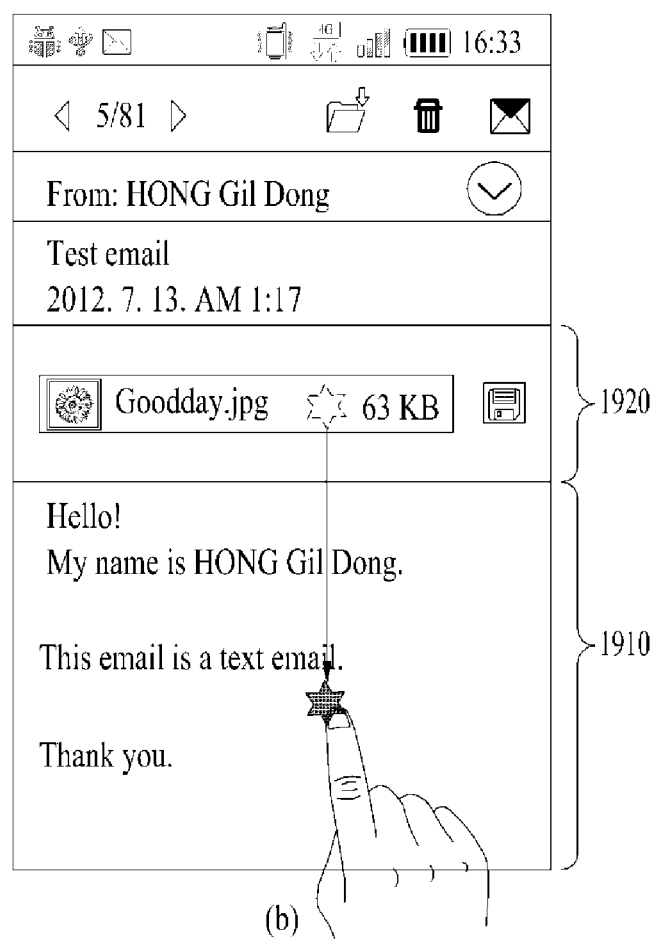
Figure 19C:
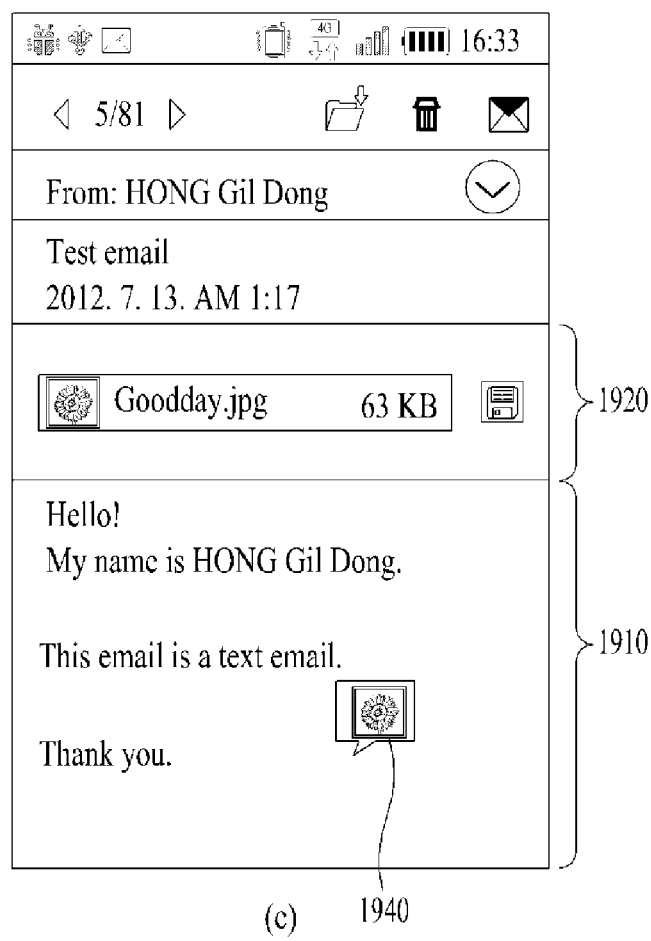
Figure 19D:
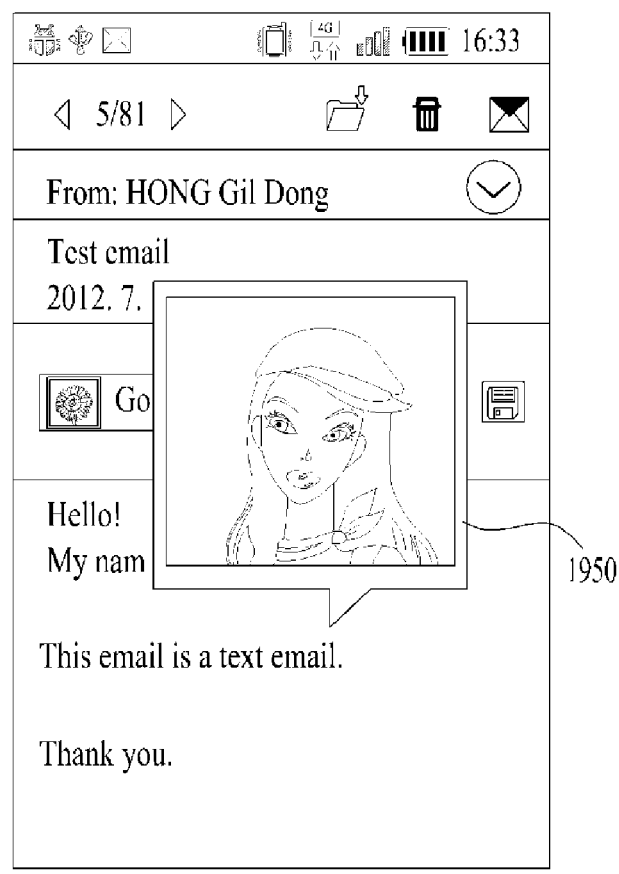

FIG. 18 is a diagram for one example to describe a process for displaying a message received from a counterpart on a touchscreen.

Referring to FIG. 18, the controller 180 can control a text region 1810 and an attach region 1820 to be displayed. In this case, the text region 1810 is provided to display a text content of a message received from a counterpart and the attach region 1820 is provided to display an information of an attachment file attached to the message received from the counterpart. As mentioned in the description of the example shown in FIG. 6, if a message having a multimedia file inserted in an edit region is received, the multimedia file may be displayed on the text region 1810.

Thereafter, referring now to FIG. 17, while the message received from the counterpart is displayed through the touchscreen, if the information of the attachment file, which is displayed on the attach region, is touched and dragged to the text region [S1702], the controller 180 can control a queue object for activating the attachment file to be displayed on the text region [S1703]. Subsequently, if the queue object displayed on the text region is touched [S1704], the controller 180 can control a popup window for activating the attachment file to be displayed [S1705].

In the following description, a process for displaying a queue object to activate an attachment file on a touchscreen is explained with reference to FIG. 19.

FIG. 19 is a diagram for one example to describe a process for displaying a queue object to activate an attachment file on a touchscreen. For clarity of the following description, assume that an image file is set as an attachment file.

Referring to FIG. 19, if an image file is attached to a message received from a counterpart, the controller 180 can control an information of the image file to be displayed on an attach region 1920 [FIG. 19 (*a*)]. In doing so, if an information 1930 of the image file, which is displayed on the attach region 1920, is touched and then dragged to a text region 1910 [FIG. 19 (*b*)], the controller 180 can control a queue object 1940, which is provided to guide an activation of the image file, to be displayed at a pointer released point [FIG. 19 (*c*)]. In particular, in displaying the queue object 1940, the controller 180 can control an icon, which corresponds to a type of the attachment file, to be included in the queue object 1940. Since the image file is set as the attachment file in FIG. 19 (*c*), the controller 180 may control the icon corresponding to the image file to be included in the queue object 1940.

Thereafter, referring to FIG. 19 (*d*), if a user touches the queue object 1940, the controller 180 can control a popup window 1950, which is provided to display an image set as the attachment file, to be displayed. Like the example shown in FIG. 19 (*d*), an activation result of the attachment file is displayed on the popup window 1950, whereby a content of the attachment file can be checked without switching a screen. In the example shown in FIG. 19 (*d*), the user can check the content of the attachment file while checking the text content of the message.

Moreover, when the activation result of the attachment file is displayed on the popup window 1950, in order to minimize a portion of the popup window 1950 that covers the touchscreen, the controller 180 may control the popup window 1950 to be displayed semi-transparently [not shown in the drawing].

In case that a screen switching of the touchscreen occurs, the controller 180 of the present invention can control the queue object to keep being displayed on the touchscreen. For instance, referring to FIG. 19 (*c*), after the message received from the counterpart has been checked, even if a different application is activated, the controller 180 can control the queue object 1940 to keep being displayed. This is to control the attachment file, which is attached to the message received from the counterpart, to be activated while the different application is active.

In the example shown in FIG. 17, if the queue object displayed in response to an action of touching and dragging the attachment file to the text region is touched, the attachment file can be activated. On the other hand, a mobile terminal according to another embodiment of the present invention can control a popup window, which is provided to activate an attachment file directly without displaying a queue object, to be displayed if the attachment file is touched and dragged to a text region.

Accordingly, embodiments of the present invention provide various effects and/or features.

First of all, the present invention provides a mobile terminal, by which user's convenience is enhanced.

In particular, the present invention provides a mobile terminal, by which a multimedia file set as an attachment file can be inserted in a text region of a message in a simple manner. And, the present invention provides a mobile terminal, by which a multimedia file inserted in a text region of a message can be set as an attachment file in a simple manner.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a computer system are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen for sending a message comprising a first region and a second region and the touchscreen configured to display an edit region in the first region for writing a message to transmit to at least one counterpart and an attach region in the second region for displaying a multimedia file set as an attachment file of the message; and
a controller configured to:
display the multimedia file in the attach region in a file name form;
detect a touch and drag input of the multimedia file from the attach region to the edit region;
insert the multimedia file to the edit region; and
lose a status of the attachment multimedia file and convert the multimedia file into a portion of a written message in the edit region in a preview form;
wherein when the multimedia file is inserted to the edit region having a different multimedia file displayed thereon, the controller is configured to combine the multimedia file and the different multimedia file together,
wherein the combining the multimedia file and the different multimedia file includes merging the multimedia file and the different multimedia file into a single file, or setting the multimedia file and the different multimedia file to a single playlist.

2. The mobile terminal of claim 1, wherein the controller is configured to display a control panel for controlling a playback of the multimedia file to be displayed on the edit region corresponding to the converting.

3. The mobile terminal of claim 1, wherein the inserted multimedia file to the edit region comprises an image file, and the controller is configured to control at least one of a resolution and an image size of the image file to be adjusted automatically or manually.

4. The mobile terminal of claim 3, wherein when the image size of the image file is greater than a size of the touchscreen, the controller is configured to control the image size of the image file to become smaller than the size of the touchscreen.

5. The mobile terminal of claim 1, wherein the controller is configured to display the multimedia file in the attach region with an information of the multimedia file.

6. The mobile terminal of claim 5, wherein when a 1st touch input is applied to the information of the multimedia file, the controller is configured to activate the multimedia file and
wherein when a 2nd touch input is applied to the information of the multimedia file, the controller is configured to control a thumbnail of the multimedia file to be displayed.

7. The mobile terminal of claim 5, wherein the information of the multimedia file comprises at least one selected from the group consisting of a file name of the multimedia file, an icon corresponding to a type of the multimedia file and a thumbnail of the multimedia file.

8. The mobile terminal of claim 1, wherein the multimedia file comprises an image file and wherein the 2nd file type comprises a PNG (portable network graphics) format.

9. The mobile terminal of claim 1, wherein the 2nd file type comprises a file format having a compression ratio higher than that of the 1st file type.

10. The mobile terminal of claim 1, wherein the controller is configured to:
detect a touch and drag input of the inserted multimedia file from the edit region to the attach region; and
delete the converted multimedia file in the edit region in a preview form.

11. The mobile terminal of claim 1, wherein the multimedia file comprises at least one selected from the group consisting of an image file, a video file, a music file and a document file.

12. The mobile terminal of claim 1, wherein the attachment region comprises a display region of file attach button for inserting the attachment file.

13. The mobile terminal of claim 1, wherein the message comprises at least one selected from the group consisting of an email, a text message and an instant message.

14. A method of controlling a mobile terminal, comprising the steps of:
displaying an edit region in a first region for writing a message to transmit to at least one counterpart and an attach region in a second region for displaying a multimedia file set as an attachment file of the message, wherein the first region and the second region comprises a touchscreen for sending a message;
displaying the multimedia file in the attach region in a file name form;
detecting a touch and drag input of the multimedia file from the attach region to the edit region;
inserting the multimedia file to the edit region: and
losing a status of the attachment file and converting the multimedia file into a portion of a writing message in the edit region in a preview form,
wherein when the multimedia file is inserted to the edit region having a different multimedia file displayed thereon, the controller is configured to combine the multimedia file and the different multimedia file together,
wherein the combining the multimedia file and the different multimedia file includes merging the multimedia file and the different multimedia file into a single file, or setting the multimedia file and the different multimedia file to a single playlist.

15. A non-transitory computer-readable recording medium comprising a mobile terminal controlling method having $1^{st}$ to $5^{th}$ commands recorded therein, wherein the $1^{st}$ command is configured to display an edit region in a first region for writing a message to transmit to at least one counterpart and an attach region in a second region for displaying a multimedia file set as an attachment file of the message, wherein the first region and the second region comprises a touchscreen for sending a message,
- the $2^{nd}$ command is configured to display the multimedia file in the attach region in a file name form;
- the $3^{rd}$ command is configured to detect a touch and drag input of the multimedia file from the attach region to the edit region;
- the $4^{th}$ command is configured to insert the multimedia file to the edit region; and
- the $5^{th}$ command is configured to lose a status of the attachment file and convert the multimedia file into a portion of a writing message in the edit region in a preview form,
- wherein when the multimedia file is inserted to the edit region having a different multimedia file displayed thereon, the controller is configured to combine the multimedia file and the different multimedia file together,
- wherein the combining the multimedia file and the different multimedia file includes merging the multimedia file and the different multimedia file into a single file, or setting the multimedia file and the different multimedia file to a single playlist.

* * * * *